US012650038B2

(12) United States Patent
Rudolf et al.

(10) Patent No.: US 12,650,038 B2
(45) Date of Patent: Jun. 9, 2026

(54) ACTUATING DEVICE FOR MOVING COVERS FOR VEHICLES

(71) Applicant: Illinois Tool Works Inc., Glenview, IL (US)

(72) Inventors: Andreas Rudolf, Eibelstadt (DE); Fritz Göbel, Würzburg (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/131,073

(22) Filed: Apr. 5, 2023

(65) Prior Publication Data

US 2023/0340812 A1 Oct. 26, 2023

(30) Foreign Application Priority Data

Apr. 26, 2022 (DE) ..................... 10 2022 110 013.8

(51) Int. Cl.

*E05B 85/10* (2014.01)
*E05B 17/18* (2006.01)
*E05B 81/76* (2014.01)

(52) U.S. Cl.

CPC .......... *E05B 85/103* (2013.01); *E05B 17/181* (2013.01); *E05B 81/76* (2013.01)

(58) Field of Classification Search

CPC ....... E05B 85/103; E05B 17/181; E05B 81/76
See application file for complete search history.

(56) References Cited

U.S. PATENT DOCUMENTS

| | | | | |
|---|---|---|---|---|
| 681,075 | A | 8/1901 | Perkins | |
| 1,081,319 | A | 12/1913 | Ernest | |
| 3,034,802 | A | 5/1962 | Axtmann | |
| 3,712,362 | A | 1/1973 | Alderfer | |
| 4,867,501 | A | 9/1989 | Nomura | |
| 6,923,481 | B2 | 8/2005 | Bruderick | |
| 7,062,945 | B2 | 6/2006 | Saitoh | |
| 7,404,588 | B2 | 7/2008 | Gabsch | |
| 7,621,573 | B2 | 11/2009 | Thomas | |
| 8,089,228 | B2 | 1/2012 | Ballard | |
| 8,443,553 | B1 * | 5/2013 | Polewarczyk .......... | E05B 81/77 292/DIG. 31 |

(Continued)

FOREIGN PATENT DOCUMENTS

| | | | |
|---|---|---|---|
| CN | 108843162 | A | 11/2018 |
| CN | 108979368 | A | 12/2018 |

(Continued)

*Primary Examiner* — Mark A Williams
(74) *Attorney, Agent, or Firm* — McAndrews, Held & Malloy, Ltd.

(57) ABSTRACT

An actuating apparatus (100, 200, 300, 400, 500, 600, 700) for moving covers (102, 202, 302, 402, 502, 602, 702), in particular flush covers, for vehicles, wherein the cover (102, 202, 302, 402, 502, 602, 702) is reversibly movable, and in particular pivotable, between a closed position and an open position in which the cover is arranged behind an outer skin of the vehicle, wherein the actuating apparatus (100) comprises the following: a kinematics for reversibly moving, in particular pivoting, the cover (102, 202, 302, 402, 502, 602, 702) between the open position and the closed position; and a first sensor apparatus (112, 212, 312, 412, 512, 612, 712) for detecting the open position and/or the closed position of the cover (102, 202, 302, 402, 502, 602, 702).

20 Claims, 16 Drawing Sheets

100

(56) References Cited

U.S. PATENT DOCUMENTS

| | | | | |
|---|---|---|---|---|
| 9,062,478 | B2 | 6/2015 | Bingle | |
| 9,156,335 | B1 | 10/2015 | Harter | |
| 9,458,649 | B2 | 10/2016 | Fujiwara | |
| 9,643,487 | B2 | 5/2017 | Szawarski | |
| D806,513 | S | 1/2018 | Curic | |
| 10,052,947 | B2 | 8/2018 | Herrmann | |
| 10,053,893 | B1 | 8/2018 | Patel | |
| 10,253,533 | B1 | 4/2019 | Pudney | |
| 10,435,924 | B1 | 10/2019 | Salter | |
| 10,577,845 | B2 | 3/2020 | Herczeg | |
| 10,615,534 | B2 | 4/2020 | Herczeg | |
| 10,655,371 | B2 | 5/2020 | Soonthornwinate | |
| 10,711,494 | B2 | 7/2020 | Bingle | |
| 10,760,307 | B2 | 9/2020 | Rocci | |
| 10,884,316 | B2 | 1/2021 | Yoshizawa | |
| 10,897,936 | B2 | 1/2021 | Berger | |
| 10,934,748 | B2 | 3/2021 | Harajli | |
| 10,941,603 | B2 | 3/2021 | Linden | |
| 10,988,962 | B2 | 4/2021 | Park | |
| 11,027,646 | B2 | 6/2021 | Kothe | |
| 11,040,615 | B2 | 6/2021 | Herzig | |
| 11,085,212 | B2 | 8/2021 | Rivaya | |
| 11,244,321 | B2 | 2/2022 | Wu | |
| 11,248,403 | B2 | 2/2022 | Boberschmidt | |
| 11,479,995 | B2 | 10/2022 | Löw | |
| 11,553,887 | B2 | 1/2023 | Mclaughlin | |
| 11,560,741 | B2 | 1/2023 | Guerin | |
| 11,821,245 | B2 | 11/2023 | Herdering | |
| 2004/0177478 | A1* | 9/2004 | Louvel | E05B 79/06<br>16/430 |
| 2005/0121924 | A1 | 6/2005 | Chanya | |
| 2006/0279095 | A1 | 12/2006 | Ishiguro | |
| 2008/0163555 | A1 | 7/2008 | Thomas | |
| 2009/0058132 | A1 | 3/2009 | Browne | |
| 2013/0079984 | A1* | 3/2013 | Aerts | G07C 9/00944<br>292/336.3 |
| 2013/0127185 | A1* | 5/2013 | Lang | E05B 81/77<br>292/336.3 |
| 2014/0000167 | A1* | 1/2014 | Patel | E05B 85/103<br>49/32 |
| 2014/0047877 | A1 | 2/2014 | Guenther | |
| 2014/0300115 | A1 | 10/2014 | Vasi | |
| 2015/0048644 | A1 | 2/2015 | Georgi | |
| 2015/0315812 | A1* | 11/2015 | Vasi | E05B 81/08<br>292/336.3 |
| 2016/0010369 | A1 | 1/2016 | Specht | |
| 2016/0208523 | A1 | 7/2016 | Bingle | |
| 2017/0066312 | A1 | 3/2017 | Coutier | |
| 2018/0163442 | A1 | 6/2018 | Soonthornwinate | |
| 2019/0078360 | A1 | 3/2019 | Blount | |
| 2019/0100948 | A1 | 4/2019 | Low | |
| 2019/0112842 | A1 | 4/2019 | Wilke | |
| 2019/0112846 | A1 | 4/2019 | Laval | |
| 2019/0234121 | A1 | 8/2019 | Pudney | |
| 2019/0368239 | A1* | 12/2019 | Rhein | E05B 85/103 |
| 2020/0308883 | A1* | 10/2020 | Bresser | E05B 81/90 |
| 2020/0332575 | A1* | 10/2020 | Christensen | E05B 85/18 |
| 2020/0362604 | A1* | 11/2020 | Jarnicki | E05B 81/20 |
| 2021/0062558 | A1* | 3/2021 | Beck | E05B 81/90 |
| 2021/0332619 | A1 | 10/2021 | Peterson | |
| 2022/0042356 | A1* | 2/2022 | Herdering | E05B 81/76 |
| 2022/0243506 | A1 | 8/2022 | Moriyama | |
| 2022/0268063 | A1* | 8/2022 | Vrsecký | E05B 79/06 |
| 2022/0282533 | A1* | 9/2022 | Schütz | E05B 81/06 |
| 2022/0341226 | A1 | 10/2022 | Sobecki | |
| 2022/0372798 | A1 | 11/2022 | Gröver | |
| 2023/0258029 | A1 | 8/2023 | Philippe | |
| 2023/0265707 | A1 | 8/2023 | Alneri | |
| 2023/0349219 | A1 | 11/2023 | Zhao | |
| 2023/0417090 | A1 | 12/2023 | Guerin | |
| 2024/0093537 | A1 | 3/2024 | Wilke | |
| 2024/0125154 | A1 | 4/2024 | Peterson | |
| 2024/0246409 | A1 | 7/2024 | Zerbe | |
| 2024/0418018 | A1 | 12/2024 | Zhou | |

FOREIGN PATENT DOCUMENTS

| | | | |
|---|---|---|---|
| CN | 109477347 | A | 3/2019 |
| CN | 209723950 | U | 12/2019 |
| CN | 210732313 | U | 6/2020 |
| CN | 211549234 | U | 9/2020 |
| CN | 112443217 | A | 3/2021 |
| CN | 113090142 | A | 7/2021 |
| CN | 115538871 | A | 12/2022 |
| DE | 19642687 | A1 | 4/1998 |
| DE | 19919251 | A1 | 11/2000 |
| DE | 69803826 | T2 | 11/2002 |
| DE | 10249703 | A1 | 5/2004 |
| DE | 19740827 | B4 | 6/2006 |
| DE | 102008019335 | A1 | 10/2008 |
| DE | 102011017240 | A1 | 12/2011 |
| DE | 102010053137 | A1 | 6/2012 |
| DE | 10128866 | B4 | 8/2012 |
| DE | 102013212083 | A1 | 1/2014 |
| DE | 102012020710 | A1 | 4/2014 |
| DE | 102013016885 | A1 | 6/2014 |
| DE | 202014101216 | U1 | 5/2015 |
| DE | 102014103642 | A1 | 8/2015 |
| DE | 102014109738 | A1 | 12/2015 |
| DE | 102015209852 | A1 | 12/2016 |
| DE | 102016112423 | A1 | 1/2017 |
| DE | 202017104635 | U1 | 10/2017 |
| DE | 102016109933 | A1 | 11/2017 |
| DE | 102016110869 | A1 | 12/2017 |
| DE | 102017008108 | A1 | 1/2018 |
| DE | 102017101247 | A1 | 7/2018 |
| DE | 102017210117 | A1 | 12/2018 |
| DE | 102017212397 | A1 | 1/2019 |
| DE | 202019103205 | U1 | 7/2019 |
| DE | 102018109474 | A1 | 10/2019 |
| DE | 102017124368 | B4 | 3/2020 |
| DE | 102018128972 | A1 | 5/2020 |
| DE | 102019106436 | A1 | 9/2020 |
| DE | 102019206282 | A1 | 11/2020 |
| DE | 202021001685 | U1 | 6/2021 |
| DE | 102020106168 | A1 | 9/2021 |
| DE | 102020117046 | B3 | 9/2021 |
| DE | 102020113492 | A1 | 11/2021 |
| DE | 102020209655 | A1 | 2/2022 |
| DE | 102020130235 | A1 | 5/2022 |
| DE | 102022105502 | A1 | 9/2022 |
| DE | 102021002425 | A1 | 11/2022 |
| DE | 202022104963 | U1 | 12/2022 |
| DE | 102017126077 | B4 | 1/2023 |
| DE | 202023104889 | U1 | 11/2023 |
| DE | 102020209607 | A1 | 12/2023 |
| DE | 102020209609 | A1 | 2/2024 |
| DE | 202024100401 | U1 | 2/2024 |
| DE | 202024100582 | U1 | 3/2024 |
| DE | 202024100584 | U1 | 3/2024 |
| DE | 102023118359 | A1 | 1/2025 |
| EP | 0681075 | A2 | 11/1995 |
| EP | 1081319 | A1 | 3/2001 |
| EP | 1186734 | A1 | 3/2002 |
| EP | 1402138 | B1 | 11/2005 |
| EP | 1944436 | A2 | 7/2008 |
| EP | 2032782 | B1 | 8/2010 |
| EP | 2032783 | B1 | 8/2010 |
| EP | 2259984 | A1 | 12/2010 |
| EP | 3122967 | A1 | 2/2017 |
| EP | 2808467 | B1 | 3/2017 |
| EP | 2663705 | B1 | 7/2017 |
| EP | 3421701 | A1 | 1/2019 |
| EP | 3421702 | A1 | 1/2019 |
| EP | 3426869 | A1 | 1/2019 |
| EP | 2775076 | B1 | 9/2019 |
| EP | 3620599 | A1 | 3/2020 |
| EP | 2646277 | B1 | 4/2020 |
| EP | 3712362 | A1 | 9/2020 |
| EP | 3734002 | A1 | 11/2020 |
| EP | 3803007 | A1 | 4/2021 |
| EP | 3322870 | B1 | 10/2021 |
| EP | 3430217 | B1 | 1/2022 |
| EP | 3681750 | B1 | 4/2022 |

(56) References Cited

FOREIGN PATENT DOCUMENTS

| | | | |
|---|---|---|---|
| EP | 4019312 | A1 | 6/2022 |
| EP | 4258312 | A2 | 10/2023 |
| FR | 3034802 | A1 | 10/2016 |
| FR | 3054582 | A1 | 2/2018 |
| FR | 3071861 | A1 | 4/2019 |
| FR | 3096713 | A1 | 12/2020 |
| JP | S629655 | U | 1/1987 |
| JP | 2019027076 | A | 2/2019 |
| JP | 2019090196 | A | 6/2019 |
| KR | 100931160 | B1 | 12/2009 |
| WO | 9952727 | A1 | 10/1999 |
| WO | 0034604 | A1 | 6/2000 |
| WO | 0208550 | A2 | 1/2002 |
| WO | 0229184 | A1 | 4/2002 |
| WO | 2011047649 | A1 | 4/2011 |
| WO | 2012021782 | A2 | 2/2012 |
| WO | 2012151403 | A1 | 11/2012 |
| WO | 2015114154 | A2 | 8/2015 |
| WO | 2015144526 | | 10/2015 |
| WO | 2016077068 | A1 | 5/2016 |
| WO | 2017211500 | A1 | 12/2017 |
| WO | 2018219268 | A1 | 12/2018 |

* cited by examiner

100

100

200

600

600

700

700

ACTUATING DEVICE FOR MOVING COVERS FOR VEHICLES

RELATED APPLICATION

The present application claims the benefit of German Patent Application No. DE 10 2022 110 013.8, filed Apr. 26, 2022, the contents of which are hereby incorporated by reference.

BACKGROUND

Door handle assemblies or actuating apparatuses are used in vehicles in order to open and close doors or flaps that are arranged in car body openings. Traditionally, door handle assemblies are used in particular in vehicles in which the door handle can actuate a corresponding door lock preferably purely mechanically, for example with the aid of a Bowden cable or with the aid of other force transfer elements when the door handle is actuated. Such door handles typically extend beyond the exterior of the vehicle door in order to allow the user to grip the door handle for pulling the door open.

The aforementioned purely mechanical door handles have been increasingly replaced by electric door handles, which additionally comprise a mechanical emergency unlocking element on the basis of a Bowden cable. Such electrical door handles are often not limited to the fact that the user can grasp them for a pulling action. Rather, these can be made more flexible by the electrical opening of the door lock, because, after unlocking, only a small amount of force is then required to open the door.

For the aforementioned reasons and for aesthetic reasons, so-called flush door handles are on the rise in newer vehicles. Such flush door handles are door handles whose surface, in the resting position, lies in a plane with the surrounding body parts. Flush door handles are already available in several design variants. They can be subdivided into flush door handles that open outwardly and those that open inwardly.

The outwardly opening flush door handles are door handles that must be moved outwardly from the resting position into an exposed operating position prior to actuation. The cover of this type of flush door handles, which, in the resting position, lies flush with the surrounding body portion, is first pivoted into an exposed operating position and then serves as a handle for opening the door.

In the case of the inwardly opening flush door handles, a door handle recess is located behind the outer surface of the vehicle. The recess is configured so that the user can engage with the recess in order to open the door. To prevent an accumulation of dirt and water and to prevent ice in the door handle recess, in the case of such inwardly opening flush door handles, a cover is also provided, which is arranged flush with the surrounding outer surface of the vehicle in the resting position of the door handle. To engage the door recess, this cover is then pushed or pivoted into the recess. This can be done either manually by the hand of the user or automatically, for example by an electric drive.

In the construction of apparatuses for moving such covers for flush door handles, it is in particular a challenge to design them so as to be electrically and simultaneously actuatable. The manual actuation option is necessary if there is a failure of the electrical drive of the cover. Further, it is often problematic to guarantee that the cover reliably and repeatably comes to lie flush with the outer surface of the vehicle in its closed position. This is made more difficult in particular in the case of inwardly opening flush door handles by the fact that dirt or ice can become deposited in the door handle recess, which can impair a movement of the cover into the closed position or out of the closed position.

SUMMARY

The present disclosure relates generally to actuating apparatuses for moving covers for vehicles, substantially as illustrated by and described in connection with at least one of the figures, as set forth more completely in the claims. Specifically, the disclosure relates to door handle assemblies, in particular for flush door handles. The present disclosure further relates to vehicles having such an apparatus.

Accordingly, the disclosure relates to an actuating apparatus for covers of vehicles, wherein the cover has a closed position in which the cover can be positioned flush with an exterior of the body of the vehicle and an open position in which the cover can be positioned inside a vehicle body, i.e. behind the outer skin. The apparatus comprises a kinematics for reversibly moving, in particular pivoting, the cover between the open position and the closed position. The apparatus comprises a first sensor apparatus for detecting the open position and/or the closed position of the cover.

The advantages of the apparatus according to the disclosure include the provision of the sensor apparatus ensures that the position of the cover is detectable at all times. Accordingly, as soon as the cover has been transitioned into its open position, an electrical unlocking of the vehicle door can take place. A mechanical unlocking of the vehicle door is only necessary in an emergency.

According to a further aspect, the kinematics comprises at least one cam disk for activating the first sensor apparatus upon a transition of the cover from the open position into the closed position. Accordingly, the sensor apparatus can be configured as a button, for example, which is contacted by the cam disk during an opening movement of the cover and thus closed. The switch can thus provide an electrical signal to the drive of the unlocking apparatus. Alternatively, the sensor apparatus can be configured as a Hall sensor, for example, which detects a magnetic strip mounted on the cam disk. By using a cam disk associated with the kinematics, the kinematics can be used simultaneously in order to move, and in particular pivot, the cover and generate the required sensor signal.

According to a further aspect, the kinematics comprises a first pivot arm connected to the cover and pivotable in relation to a first pivot axis, wherein the at least one cam disk for activating the first sensor apparatus is connected to the first pivot axis. According to this embodiment, only one pivot axis is necessary in order to ensure a movement of the cam disk and the cover. The apparatus according to the disclosure thus has an especially small size.

According to a further aspect, the apparatus comprises a second sensor apparatus configured so as to detect a pressing movement against the cover when the cover is in its closed position. With such a second sensor apparatus, a second actuator signal can be generated, which serves for example to automatically pivot the cover. Accordingly, the actuator signal can be used in order to activate an electric drive, for example an electric motor, which drives a pivoting movement of the cover via the kinematics. This electric drive should not be confused with the aforementioned unlocking system. Rather, the electric drive serves in order to pivot the cover. Only when the cover has been transitioned into its open position does the first sensor apparatus emit a signal to the unlocking apparatus, which then opens the door.

In the aforementioned aspect, a slight pressing movement against the cover can result in it being automatically pivoted. For example, a pressing inward of the cover towards the vehicle body can result in the activation of the second sensor apparatus. For this purpose, the kinematics can provide special degrees of freedom, as will be explained in further detail below. In summary, the cover according to this aspect is not only used in order to protect the recess against dirt or ice entry. Rather, it can also be used as an activation button in order to initiate a pivoting of the cover.

According to a further aspect, the apparatus comprises a door handle recess mounted on a body interior and configured so as to guide the movement of the kinematics during a movement between the closed position and the open position of the cover. Accordingly, the recess serves not only as a point of engagement for the user (providing a user's hand suitable door handle engagement for operating the door when the cover is in the open position) but can also be used as a guide for the cover. Thus, an especially controlled and repeatable movement of the cover can be achieved.

According to a further aspect, the door handle recess comprises a trough-shaped body, wherein the kinematics extend through an opening of the trough-shaped body, and wherein the kinematics is in particular sealed against the opening. According to this aspect, the kinematics disappears when the cover is opened, in particular in the opening of the door handle recess. Thus, only the cover is visible from the outside at any given time. This also means that the kinematics is protected against effects of weathering at all times.

According to a further aspect, the kinematics comprises at least one cam disk for activating the sensor apparatus upon a transition of the cover from the open position into the closed position, wherein the cam disk is arranged outside the door handle recess. According to this aspect, the cam disk is therefore not directly connected to the cover, but is arranged separately outside the door handle recess. Thus, on the one hand, the cam disk is not visible from the outside. On the other hand, the first sensor apparatus can thus be arranged further within the body, which leads to better protection against effects of weathering.

According to a further aspect, the cover comprises a first end and a second end opposite to the first end, wherein the first end is rotatably connected to a first pivot arm, and wherein the second end comprises a guide element for guiding the cover in the door handle recess. With such an arrangement, the pivoting movement of the first pivot arm can be converted into a sliding movement of the cover. The cover is guided securely with the guide elements at the second end. Thus, for the user, it appears that the cover is being displaced into the body interior.

According to a further aspect, the door handle recess can comprise a guide groove configured so as to receive the guide element of the cover and to guide the cover upon a movement of the cover by the kinematics.

According to a further aspect of the present disclosure, the kinematics comprises a first pivot arm connected to the cover and pivotable in relation to a first pivot axis, and wherein the cover is connected to the first pivot arm via a rotary joint. By connecting the pivot arm to the cover via a rotary joint, the orientation of the cover can be controlled (for example, aligned unchanged) during the pivoting. For example, this allows the cover to also release a majority of the door handle recess in its open position, as will be explained in further detail below. Thus, the cover does not present an issue for engagement by the user.

According to a further aspect of the present disclosure, the kinematics comprises a spring element for biasing the cover into a neutral position in relation to the first pivot arm. The provision of a spring element, for example an annular spring, serves to automatically bring the cover, which is rotatably mounted in relation to the first pivot arm, into a preferred orientation in relation to the body and the door handle recess, respectively. Accordingly, a further active control is not necessary.

According to a further aspect of the present disclosure, the kinematics comprises a first pivot arm connected to the cover via a first rotary joint and pivotable in relation to a first pivot axis, wherein the kinematics also comprises a second pivot arm connected to the cover via a second rotary joint and pivotable in relation to a second pivot axis, wherein the two pivot arms form a four-bar linkage for the cover. The use of two pivot arms to form a four-bar linkage has the advantage, on the one hand, that the cover maintains a consistent orientation, for example a vertical orientation, during its closed position and its open position. In addition, the two pivot arms ensure a stable retention of the cover in the door handle recess.

According to a further aspect, the actuating apparatus comprises a door handle recess mounted on a body interior, and wherein the second pivot arm is fork-shaped and arranged outside the door handle recess. According to this aspect, only one of the two pivot arms of the four-bar linkage is arranged in the door handle recess, so that the required installation space is effectively reduced.

According to a further development of the present disclosure, the cover is arranged in the door handle recess and the second pivot arm is connected to the cover via one or more guide elements, in particular guide pins, and wherein the door handle recess comprises guide grooves for guiding the guide elements. According to this aspect, the door handle recess is used simultaneously in order to guide the two pivot arms and the cover.

According to a further aspect of the present disclosure, the actuating apparatus comprises a drive, in particular in the form of an electric motor, which is configured so as to drive the kinematics. As already mentioned above, such a drive can be used in order to reversibly move the kinematics and thus the cover between the closed position and the open position. Thus, according to this example, a manual pivoting of the cover is not necessary.

A further aspect of the present disclosure relates to a vehicle having one of the aforementioned apparatuses.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

The present disclosure relates to actuating apparatuses for moving covers for vehicles, preferably door handles for a side door of a vehicle, and in particular an outer door handle assembly, although they can also be interior door handle assemblies or door handle assemblies for a trunk lid. With respect to the aforementioned situation, the present disclosure addresses the problem of specifying a door handle assembly by which the cover can be reliably and repeatably moved into a specified (in particular flush) closed position. The actuating mechanism is likewise intended to enable electrical as well as manual actuation.

Figure 1A:
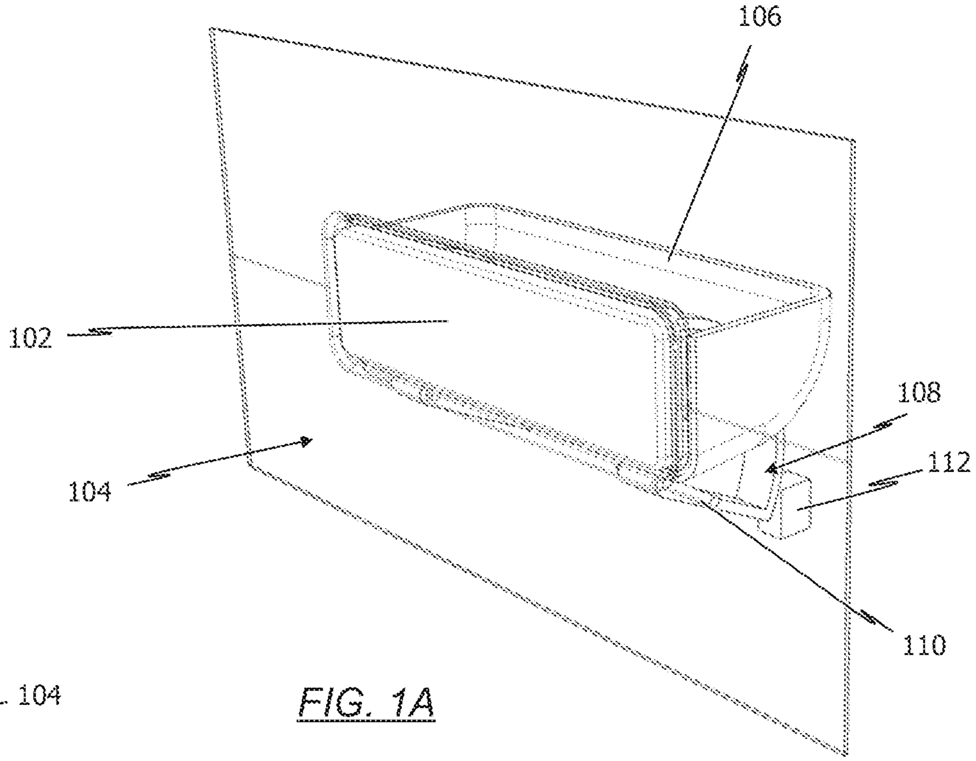
FIG. 1A illustrates a schematic perspective view of an apparatus according to an aspect of the present disclosure, in the closed position.

FIG. 1A shows a schematic perspective view of an apparatus according to an example of the present disclosure. The apparatus shown is, in particular, a door handle assembly 100 for moving a cover 102 that is connected flush with an outer skin 104 of a vehicle (not shown). In particular, in the closed position shown, a cover 102 is arranged in an opening 103 (FIG. 1B) of the vehicle outer skin 104 so that it is flush with the outer skin.

Figure 1B:
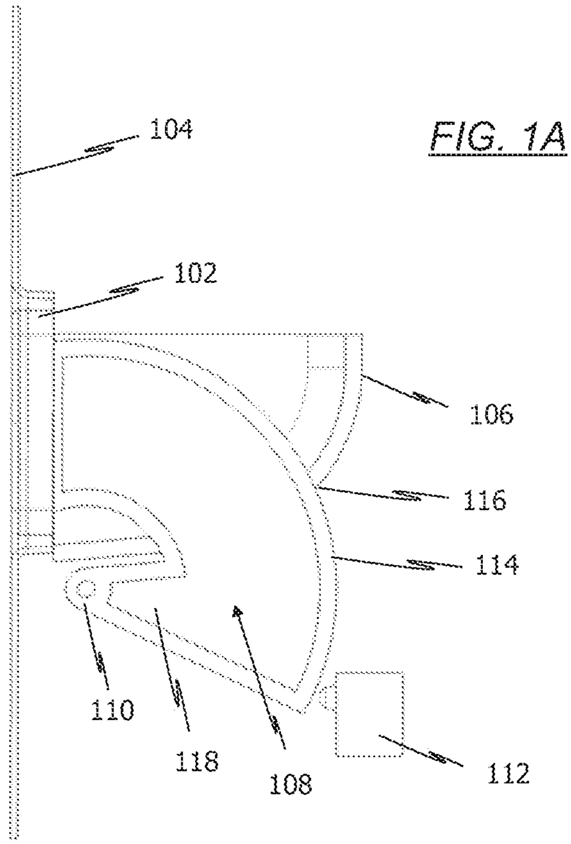
FIG. 1B illustrates a cross-section through the embodiment shown in FIG. 1A.
Figure 1C:
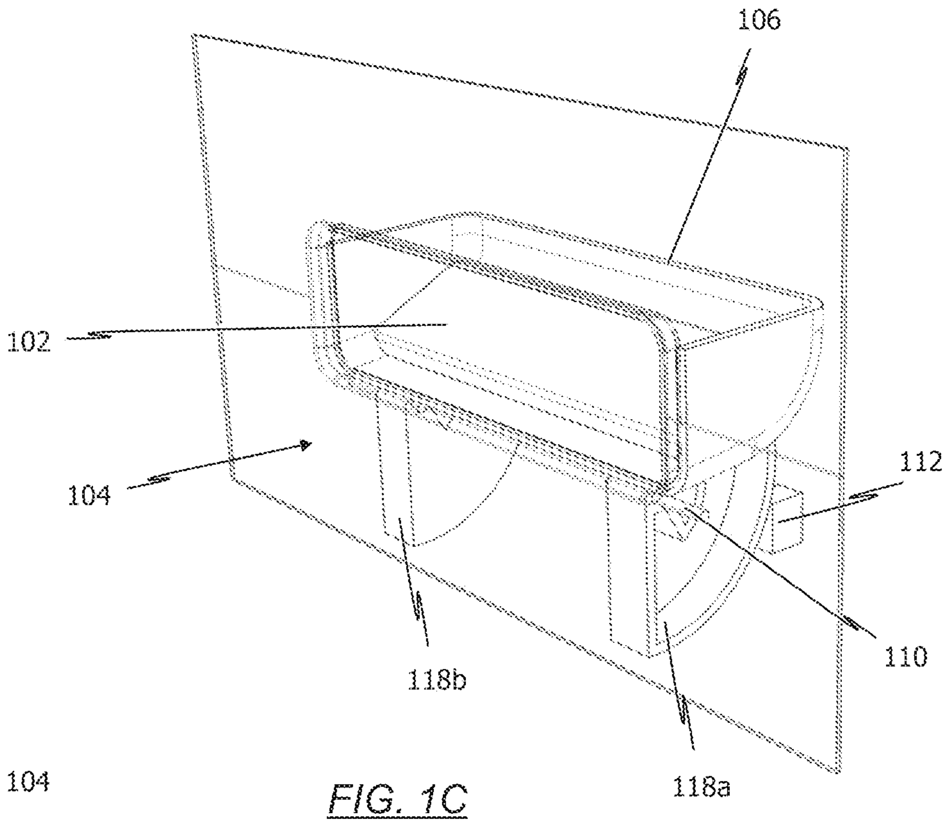
FIG. 1C illustrates a schematic perspective view of the embodiment according to FIG. 1A in its open position.

The cover 102 is reversible movable via a kinematics 108 between a closed position shown in FIG. 1A and an open position shown in FIG. 1C. In particular, the kinematics 108 shown in FIGS. 1A to 1D serve to pivot the cover 102 between its closed position and its open position. The kinematics 108 is designed in particular for inwardly opening door handles. In other words, the kinematics serves to move the cover 102 behind the outer skin in order to transition the cover 102 into the open position.

Figure 1D:
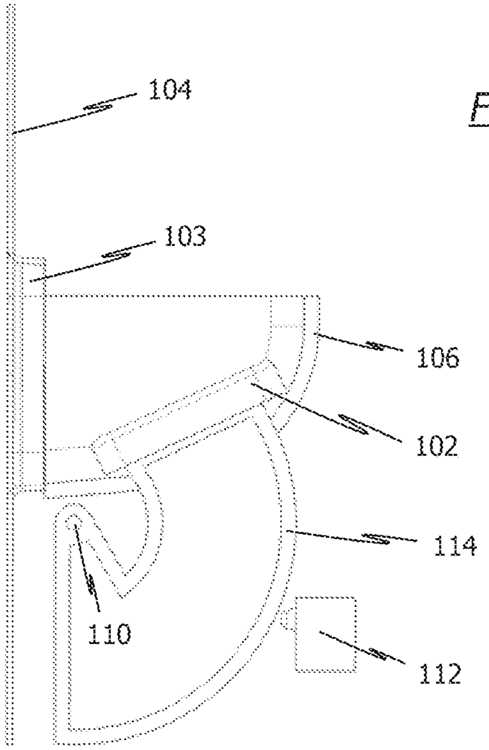
FIG. 1D illustrates a schematic cross-section through the view shown in FIG. 1C.

In the open position of the cover 102 shown in FIGS. 1C and 1D, a door handle recess 106 located behind the cover 102 is released. The door handle recess 106 is in particular attached to an interior of the outer skin. The door handle recess 106 allows the user to engage with and pull open the vehicle door. The door is automatically unlocked according to the present disclosure.

As can be seen in particular in FIGS. 1B and 1D, the door handle assembly 100 comprises a first sensor apparatus 112. The first sensor apparatus 112 is shown as a button in FIGS. 1B and 1D. However, the disclosure is not limited to such a configuration of the first sensor apparatus 112. Rather, any sensor apparatus that is suitable for detecting the open position and/or the closed position of the cover can be used.

The kinematics 108 comprises a first pivot arm 118, which is pivotable about a first pivot axis 110 in order to reversibly move the cover 102 between the closed position and the open position. The first pivot axis 110 is arranged below the opening 103 and below the door handle recess 106.

In order to activate the first sensor apparatus 112 in FIGS. 1A to 1D, the kinematics 108 comprises a cam disk 114. The cam disk 114 is an integral part of a pivot arm 118, being pivotable about the first pivot axis 110 and connected, in particular fixedly connected, to the cover 102. When pivoting the first pivot arm 118 of the kinematics 108 configured as the cam disk 114 into the open position shown in FIG. 1D, there is contact between the cam disk 114 and the first sensor apparatus 112. Accordingly, as soon as the cover 102 in its open position shown in FIG. 1D, the first sensor apparatus 112 generates a signal. This signal can be emitted to an actuator (not shown), which then unlocks the vehicle door so that it can be pulled open by the user.

FIGS. 1B and 1D further show that the door handle recess 106 is substantially trough-shaped. The kinematics 108, in particular the cam disk 114 of the kinematics 108, extends through the wall of the door handle recess 106. Specifically, the kinematics 108 extends through an opening 116 of the trough-shaped door handle recess. The opening 116 is configured at the bottom of the door handle recess 106 so that the kinematics 108 and thus the cover 102 can be pivoted inwardly and downwardly. Thus, in its open position shown in FIG. 1D, the cover 102 substantially completely releases the door handle recess 106.

The cam disk 114 of the kinematics 108 can be sealed against the opening 116 such that water penetrating the door handle recess 106 upon actuation of the cover 102 cannot pass through the opening 116 into the interior of the body. Rather, it is discharged outwardly again through the trough-shaped door handle recess 106.

Figure 2A:
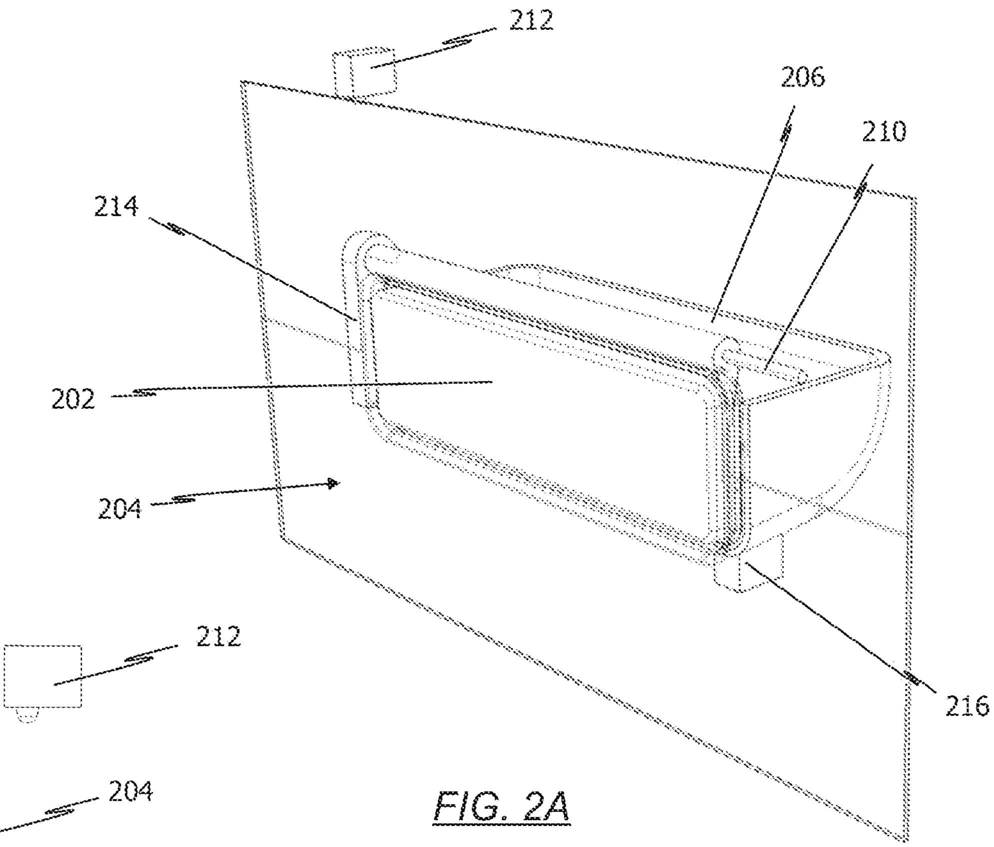
FIG. 2A illustrates a schematic perspective view of an apparatus according to an embodiment of the present disclosure, in the closed position.

FIGS. 2A to 2D show a further aspect of an apparatus according to the disclosure, in particular a door handle assembly 200. The door handle assembly 200 serves to move a cover 202 arranged flush with an outer skin 204 of a vehicle in the closed state (FIG. 2A).

A kinematics 208 of the door handle assembly 200 is connected to the cover 202. In particular, the kinematics 208 comprises a first pivot arm 218, which is arranged pivotally in relation to a first pivot axis 210. The first pivot axis 210 is arranged above the opening 203 of the outer skin 204. In other words, the first pivot axis 210 is arranged above a door handle recess 206. The door handle recess 206 is substantially identical in form to the door handle recess 106 of the door handle assembly 100. However, the door handle recess 206 does not have an opening for the kinematics 208, because it can be pivoted upwardly out of the door handle recess 206, as shown in FIGS. 2C and 2D.

Figure 2B:
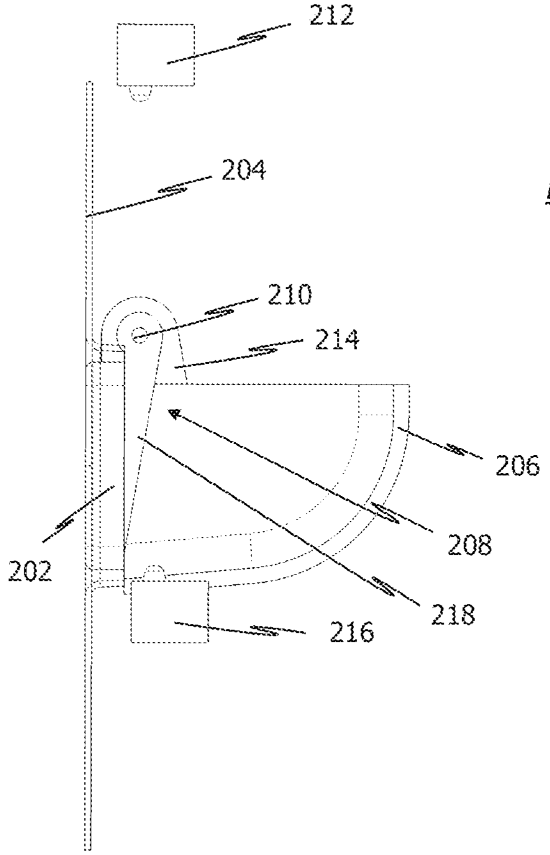
FIG. 2B illustrates a cross-section through the embodiment shown in FIG. 2A.
Figure 2C:
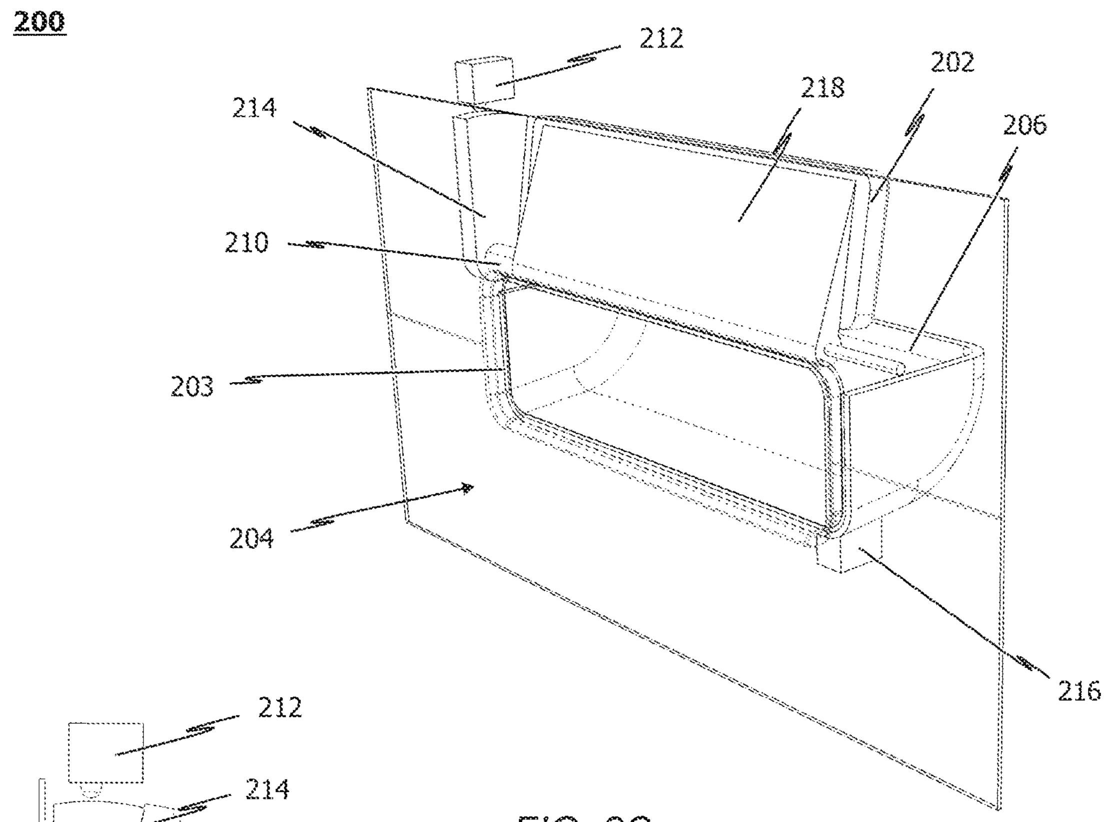
FIG. 2C illustrates a schematic perspective view of the embodiment according to FIG. 2A in its open position.
Figure 2D:
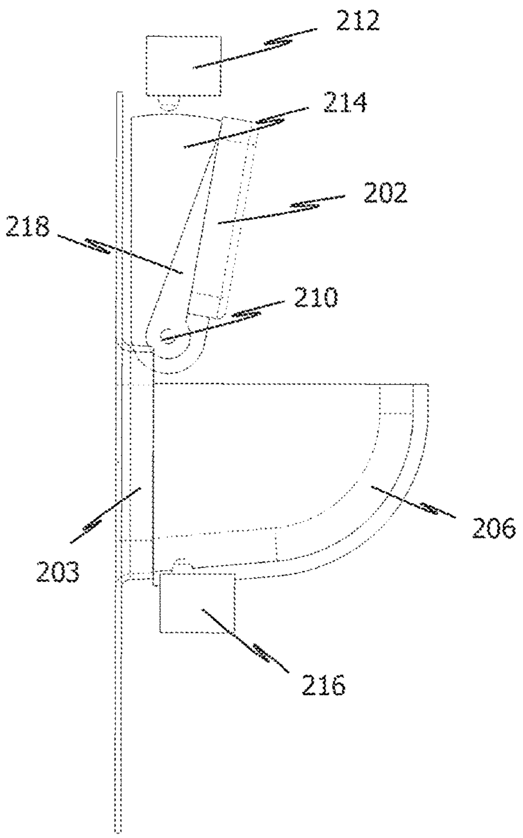
FIG. 2D illustrates a schematic cross-section through the view shown in FIG. 2C.

By pivoting the first pivot arm 218 by approximately 180°, the cover 202 is transitioned from its closed position shown in FIGS. 2A and 2B to the open position shown in FIGS. 2C and 2D. In its open position, the cover is substantially aligned parallel with an interior of the outer skin 204.

The door handle assembly 200 comprises a first sensor apparatus 212. The first sensor apparatus 212 is configured so as to detect the open position of the cover 202. In other words, as soon as the cover 202 has been transitioned into its open position (FIGS. 2C and 2D), a corresponding signal, for example an unlocking signal, is generated by the first sensor apparatus 212. The first sensor apparatus 212 shown in the figures is shown as a button, which can be activated by a cam disk 214. The cam disk 214 is configured as a component separate from the first pivot arm 218, by contrast to the example according to FIGS. 1A to 1D. However, the cam disk 214 is likewise connected to the first pivot axis 210 so that it is moved together with the first pivot arm and thus together with the cover 202. In the example of the cover 202 shown in FIG. 2C, the cam disk 214 is also pivoted upwards and thus actuates the first sensor apparatus 212. The cam disk 214 is arranged outside the door handle recess 206 and thus is not visible to the user.

The door handle assembly 200 according to FIGS. 2A to 2D further comprises a second sensor apparatus. The second sensor apparatus 216 is in particular arranged at the bottom of the door handle recess 206, preferably adjacent to the opening 203 of the outer skin 204. The second sensor apparatus 216 is configured so as to detect a pressing movement against the cover when the cover is in its closed position. This can in particular serve to generate an activation signal for an electric drive (not shown).

For example, as shown in FIG. 2B, the second sensor apparatus 216 is also configured as a button, which is arranged at the lower end of the door handle recess such that even a slight pivoting of the cover 202 out of its closed position results in contact between the cover 202 and the second sensor apparatus 216 configured as a button. This minimal pivoting can be accomplished, for example, by the user manually pressing in the cover 202. As soon as the second sensor apparatus 216 detects such a movement of the cover 202, it generates a sensor signal that can be used in order to activate the electric drive in order to fully transition the cover 202 into its open position shown in FIG. 2C. Thus, in addition to protecting the door handle recess against effects of weathering, the cover 202 can also be used as a button for activating an electric drive.

A further aspect of a door handle assembly 300 can be seen in FIGS. 3A to 3D. The door handle assembly 300 serves to move a cover 302 arranged flush with the vehicle exterior 304 in the closed state. A kinematics 308 serves to pivot the cover 302 between the closed position shown in FIG. 3A and the open position shown in FIG. 3C.

The kinematics 308 of the door handle assembly 300 here moves through an opening 315 of the door handle recess 306, similar to the example according to FIGS. 1A to 1D. In particular, the kinematics 308 comprises two pivot arms 318*a*, 318*b*, which are pivotable in relation to a common pivot axis 310. The two pivot arms 318*a*, 318*b* are respectively connected to the cover 302 via an integral cam disk 314. In particular, the first pivot arm 318*a* is attached to a side of the cover 302 shown at the right in FIG. 3A, while the second pivot arm 318*b* is connected to a left side of the cover 302.

When pivoting the kinematics 308 via the pivot arms 318*a*, 318*b*, the respective cam disk discs 314 are guided through openings 315 in the door handle recess 306.

Figure 3A:
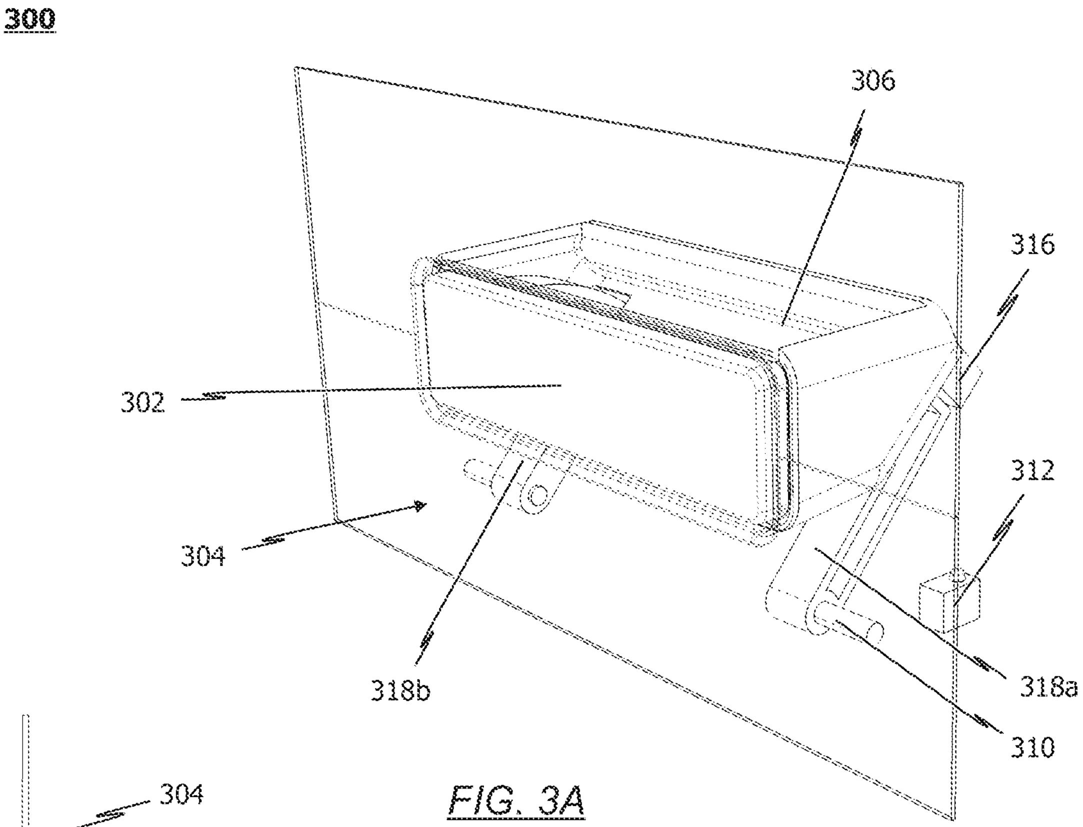
FIG. 3A illustrates a schematic perspective view of an apparatus according to an embodiment of the present disclosure, in the closed position.
Figure 3B:
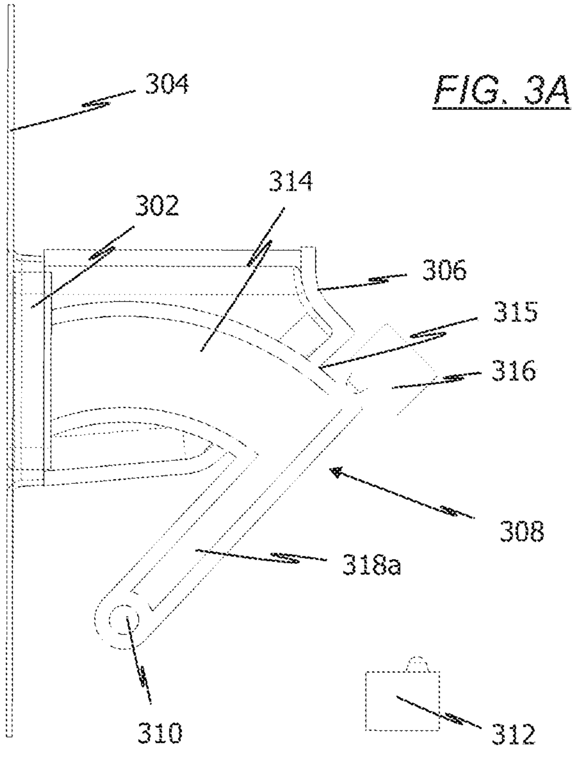
FIG. 3B illustrates a cross-section through the embodiment shown in FIG. 3A.
Figure 3C:
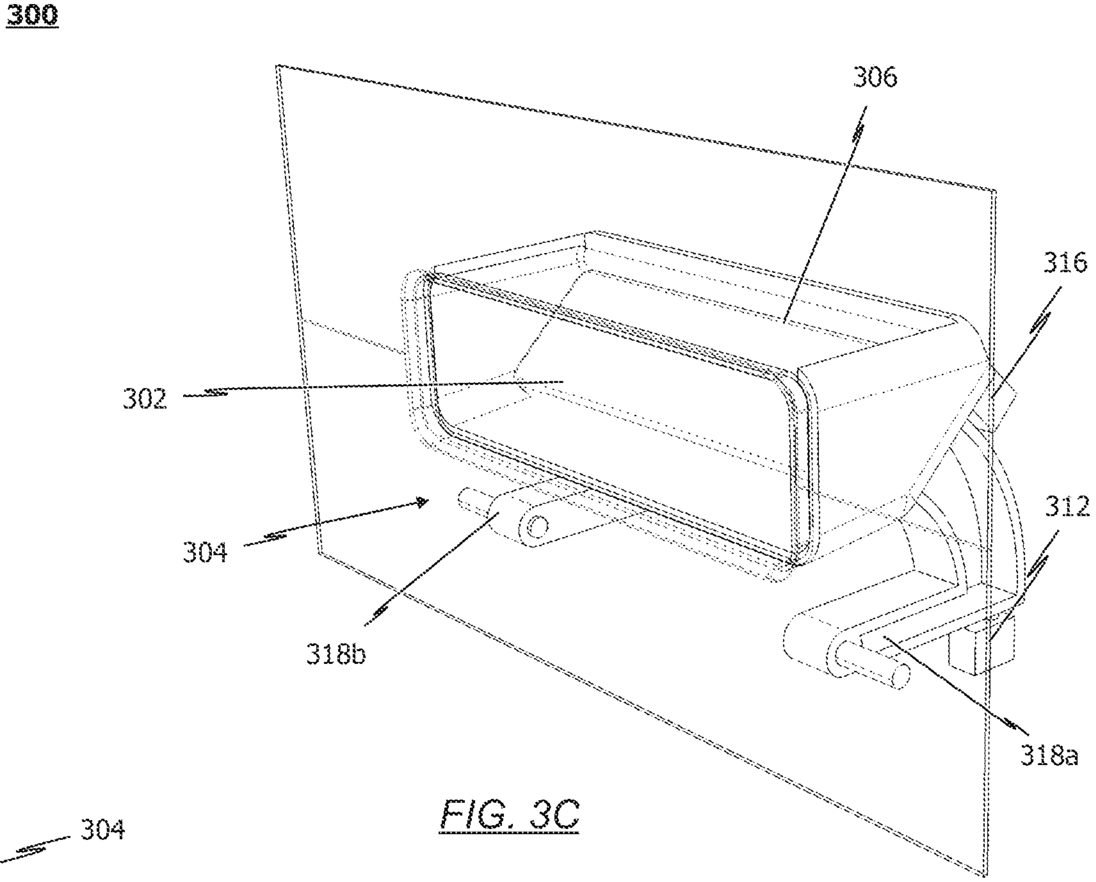
FIG. 3C illustrates a schematic perspective view of the embodiment according to FIG. 3A in its open position.
Figure 3D:
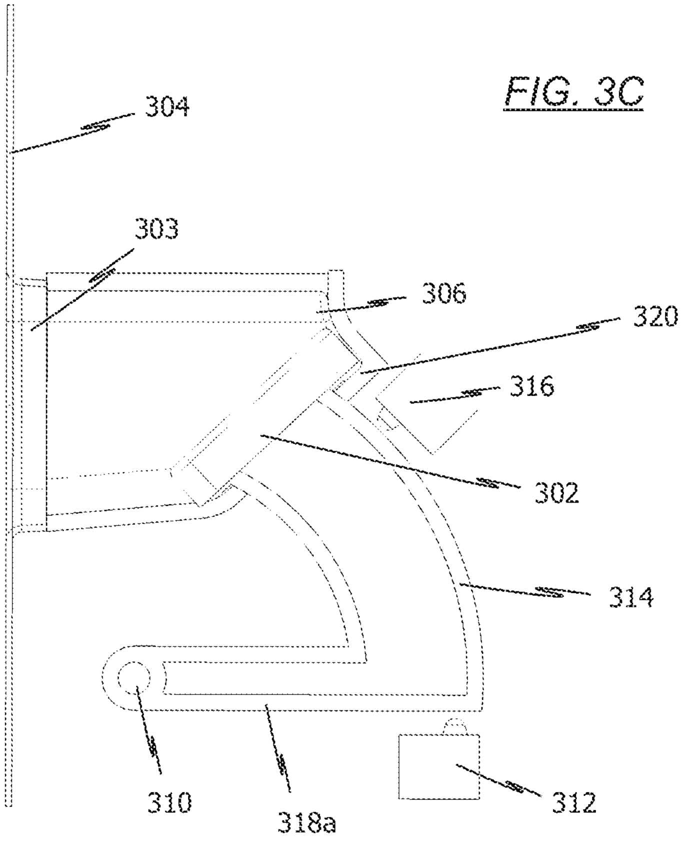
FIG. 3D illustrates a schematic cross-section through the view shown in FIG. 3C.

Similar to the example according to FIGS. 1A to 1D, the cover 302 abuts an interior of the door handle recess 306 in its open position. While the door handle recess 306 of the door handle assembly 300 is also substantially shaped like a trough, water can drain towards the outside. However, by contrast to the door handle recess 106, the door handle recess 306 comprises a flat stop face 320, which serves as a seat for the rear side of the cover 302 in its open position (FIG. 3D). The stop face 320 of the door handle recess substantially corresponds to the shape of the cover 302, so that in the open position of the cover 302, a reliable coverage is provided between the rear side of the cover 302 and the interior of the door handle recess 306.

The door handle assembly 300 comprises a first sensor apparatus 312. The first sensor apparatus 312 is configured so as to detect the open position of the cover 302. For this purpose, for example, the first sensor apparatus 312 is arranged such that the first pivot arm 318*a* pushes a button of the first sensor apparatus 312 when the cover 302 is in its open position. As mentioned above, the signal from the first sensor apparatus 312 can be used in order to activate an unlocking apparatus.

The door handle assembly 300 comprises a second sensor apparatus 316. The second sensor apparatus 316 is arranged adjacent to the opening 315 of the door handle recess 306. In particular, the second sensor apparatus 316 is arranged on the exterior of the door handle recess 306. The second sensor apparatus 316 is configured as a button, which can be activated by the cam disk 314. The cam disk 314 can be configured so as to activate the second sensor apparatus 316 as soon as the cover 302 is pivoted out of its closed position shown in FIG. 3B in the direction of the open position (also only minimally). As mentioned above, this can be used in order to activate an electric drive. As a result, the cover 302 is used as a button or push surface in order to initiate the automatic opening of the cover 302.

FIGS. 4A to 4D show a further aspect of a door handle assembly 400. The door handle assembly 400 serves to move a cover 402 arranged flush with an outer skin 404 of the vehicle in its closed position.

The door handle assembly 400 comprises a kinematics 408 configured so as to pivot the cover between its open position and its closed position. The kinematics 408 comprises a first pivot arm 418, which is pivotable in relation to a first pivot axis 410. The pivot arm 418 is rotatably connected to the cover 402 via a rotary joint 411. The position of the cover 402 in relation to the first pivot arm 418 can be biased via a spring element, for example an annular spring, in the closed position shown in FIG. 4B.

When the cover 402 pivots from the closed position into the open position, the cover 402 is twisted in relation to the pivot arm 418, for example, against the biasing of the spring element. Such a twist is generated by the contact of the cover 402 with the door handle recess 406.

Figure 4A:
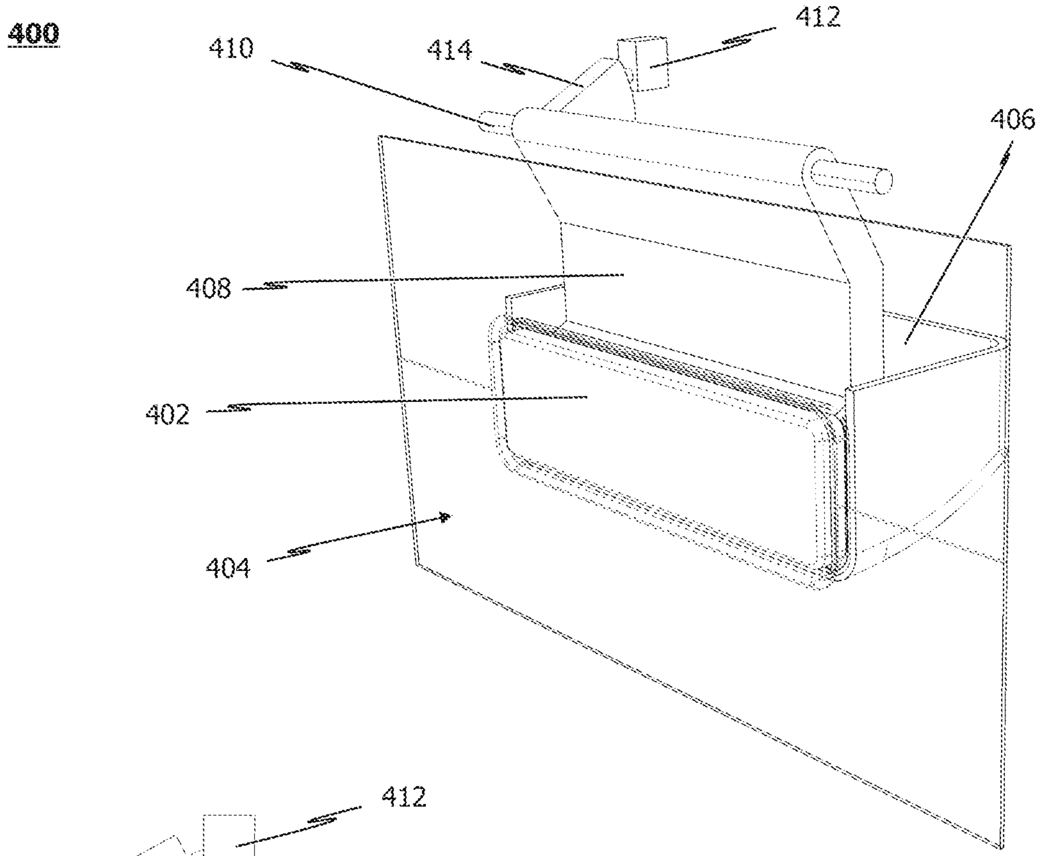
FIG. 4A illustrates a schematic perspective view of an apparatus according to an embodiment of the present disclosure, in the closed position.
Figure 4B:
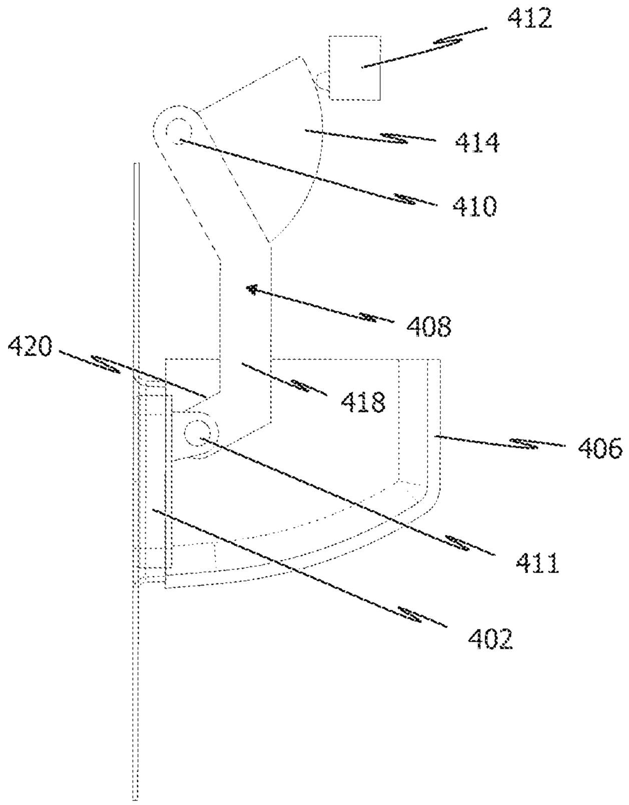
FIG. 4B illustrates a cross-section through the embodiment shown in FIG. 4A.
Figure 4C:
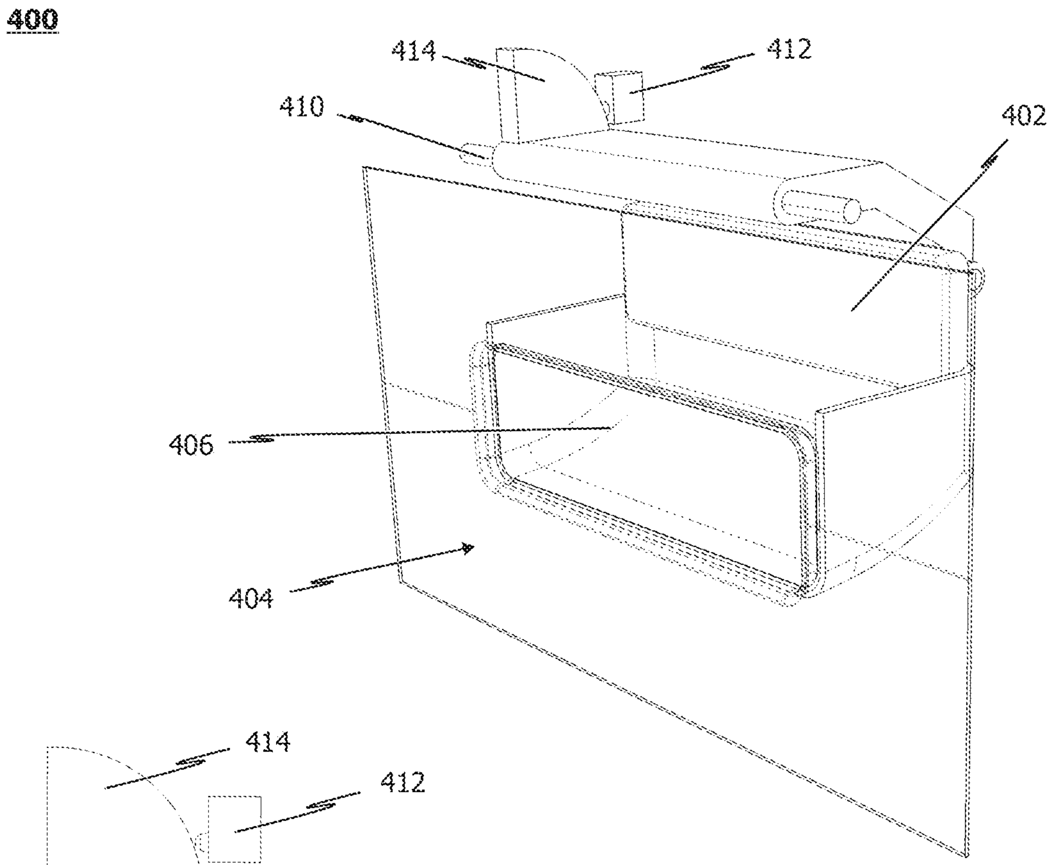
FIG. 4C illustrates a schematic perspective view of the embodiment according to FIG. 4A in its open position.
Figure 4D:
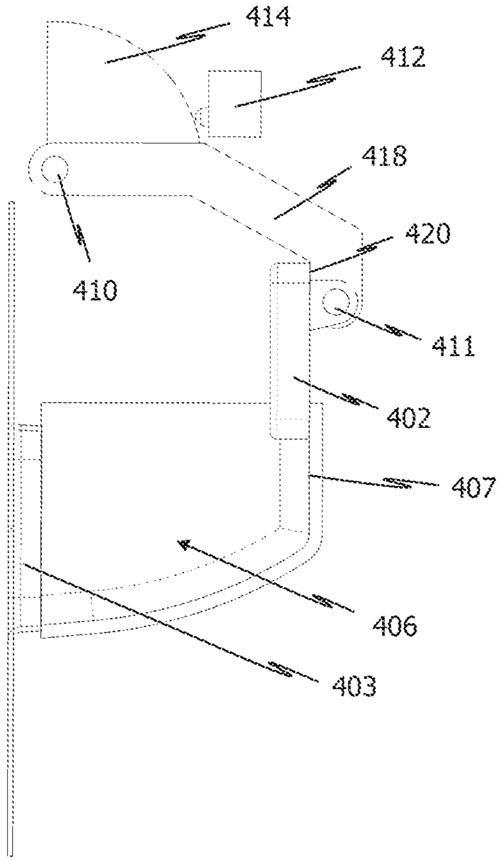
FIG. 4D illustrates a schematic cross-section through the view shown in FIG. 4C.

The pivot arm 418 comprises a stop face 420 that comes to lie flush with a flat stop face 407 of the door handle recess when the cover 402 is in the open position. In other words, the pivot arm 418 is configured such that the stop face 420 of the first pivot arm 418 lies in a plane with the stop face 407 of the door handle recess 406 when the cover is in its open position (FIG. 4D). The spring biasing pushes the rear side of the cover 402 against the stop face 407 of the door handle recess 406. Thus, in the open position, the cover 402 according to the door handle assembly 400 of FIGS. 4A to 4D will have very little to no effect on the available clearance within the door handle recess 406. Furthermore, the cover 402 is not visible to the user in its open position.

The door handle assembly 400 comprises a first sensor apparatus 412. The first sensor apparatus 412 is configured so as to detect the open position of the cover 402. For this purpose, the kinematics comprises a cam disk 414 connected to the first pivot axis 410 and configured so as to activate the first sensor apparatus 412 configured as a button when the kinematics 408 has been transitioned into the closed position of the cover 402.

In FIGS. 5A to 5D, a further aspect of an actuating apparatus configured as a door handle assembly is shown. The door handle assembly 500 serves to move a cover 502 arranged flush with an outer skin 504 of the vehicle in its closed position.

The door handle assembly 500 comprises a kinematics 508, which is configured so as to pivot the cover between its open position and its closed position. The kinematics 508 is similar to the kinematics 408, wherein however a first pivot axis 510 is configured as a vertical pivot axis.

The kinematics 508 comprises a first pivot arm 518, which is pivotable in relation to the vertical first pivot axis 510. The pivot arm 518 is rotatably connected to the cover 502 via a rotary joint 511. The position of the cover 502 in relation to the first pivot arm 518 can be biased via a spring element, for example an annular spring, in the closed position shown in FIG. 5B.

When the cover 502 pivots from the closed position into the open position, the cover 502 is twisted in relation to the pivot arm 518, for example, against the biasing of the spring element. Such a twist is generated by the contact of the cover 502 with the door handle recess 506.

Figure 5A:
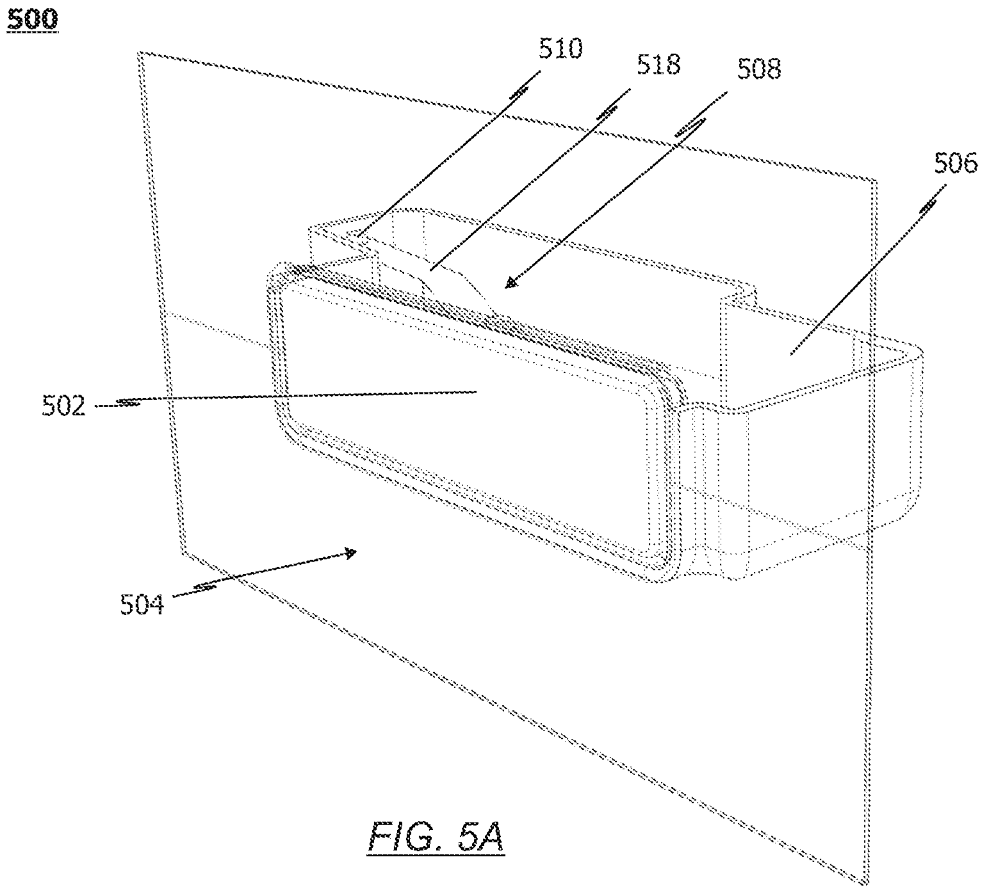
FIG. 5A illustrates a schematic perspective view of an apparatus according to an embodiment of the present disclosure, in the closed position.
Figure 5B:
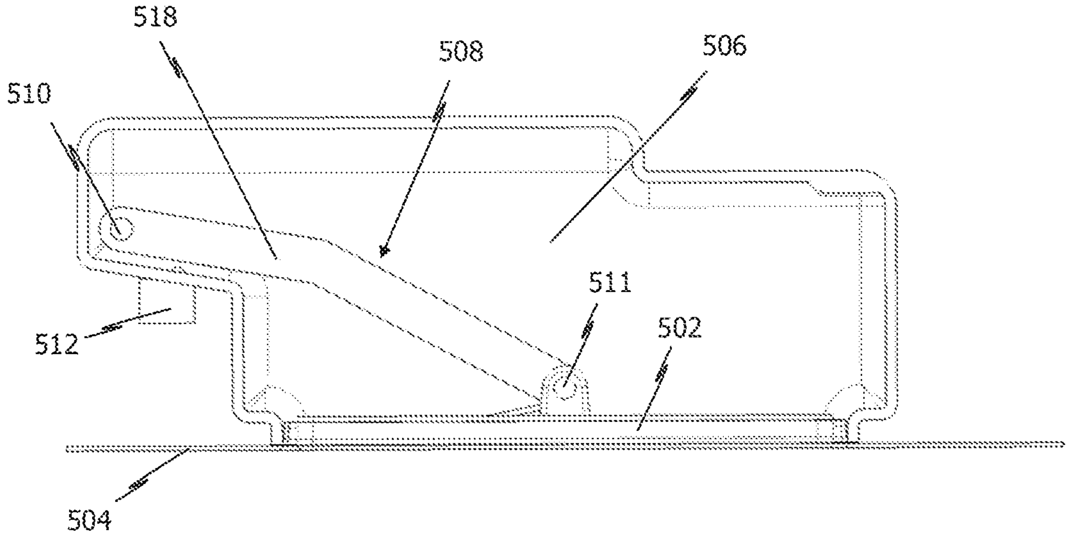
FIG. 5B illustrates a cross-section through the embodiment shown in FIG. 5A.
Figure 5C:
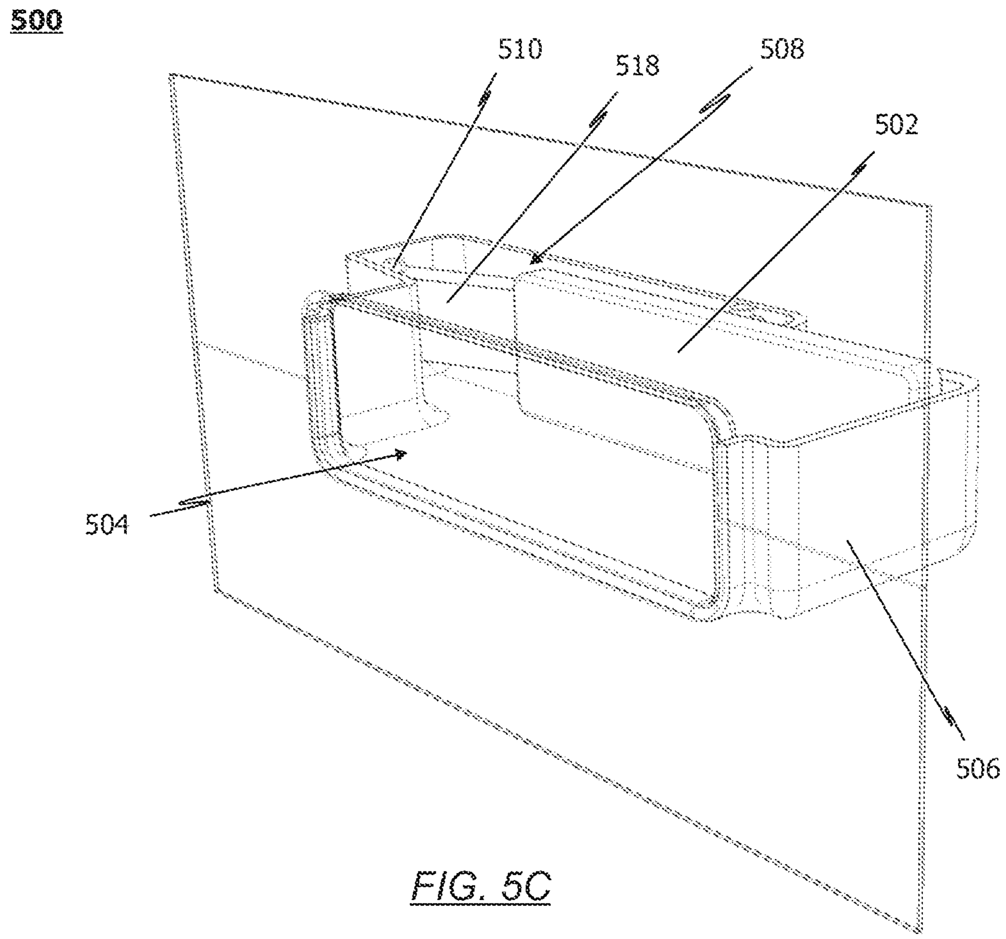
FIG. 5C illustrates a schematic perspective view of the embodiment according to FIG. 5A in its open position.
Figure 5D:
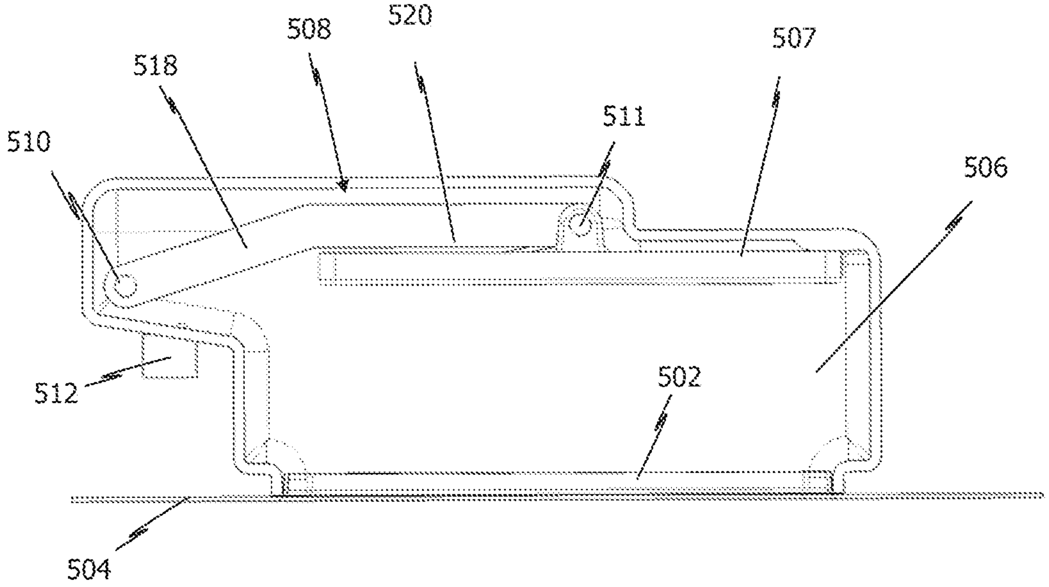
FIG. 5D illustrates a schematic cross-section through the view shown in FIG. 5C.
Figure 6A:
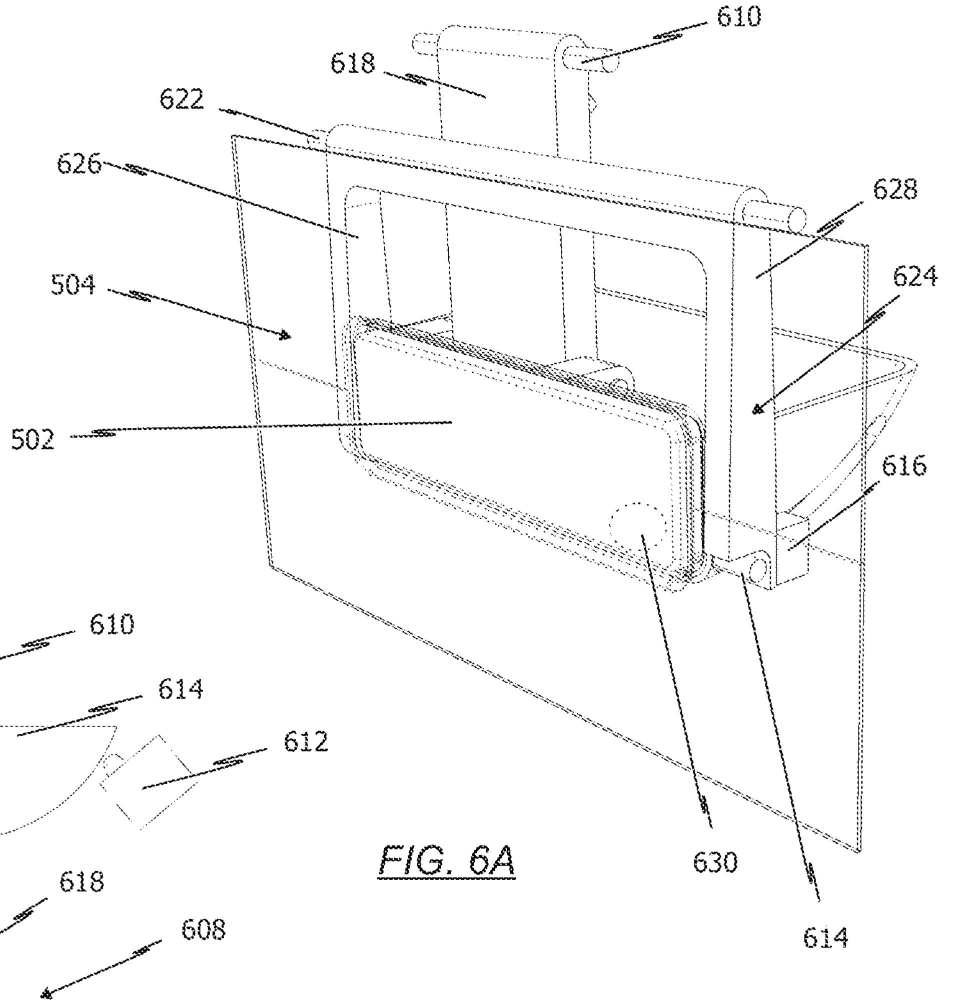
FIG. 6A illustrates a schematic perspective view of an apparatus according to an embodiment of the present disclosure, in the closed position.
Figure 6B:
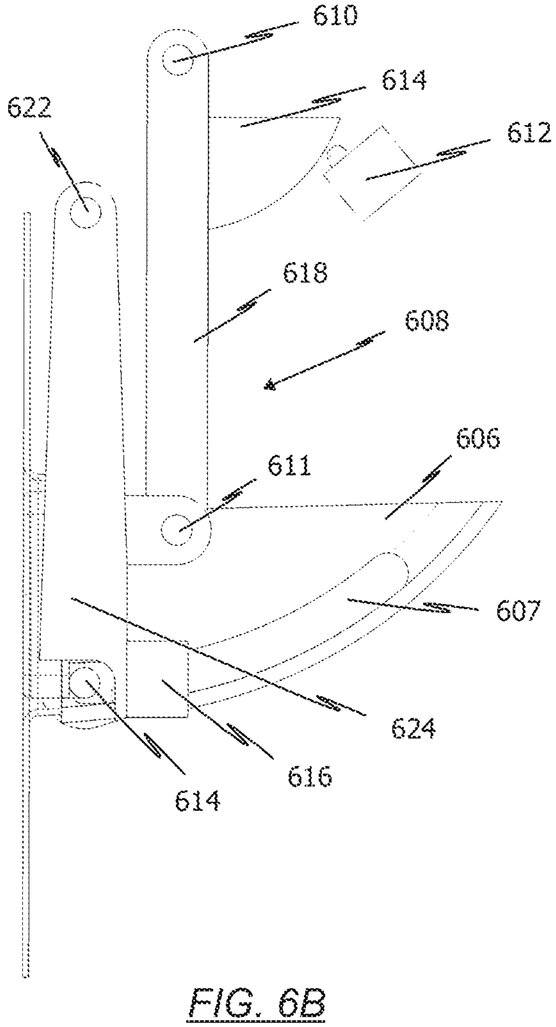
FIG. 6B illustrates a cross-section through the embodiment shown in FIG. 6A.
Figure 6C:
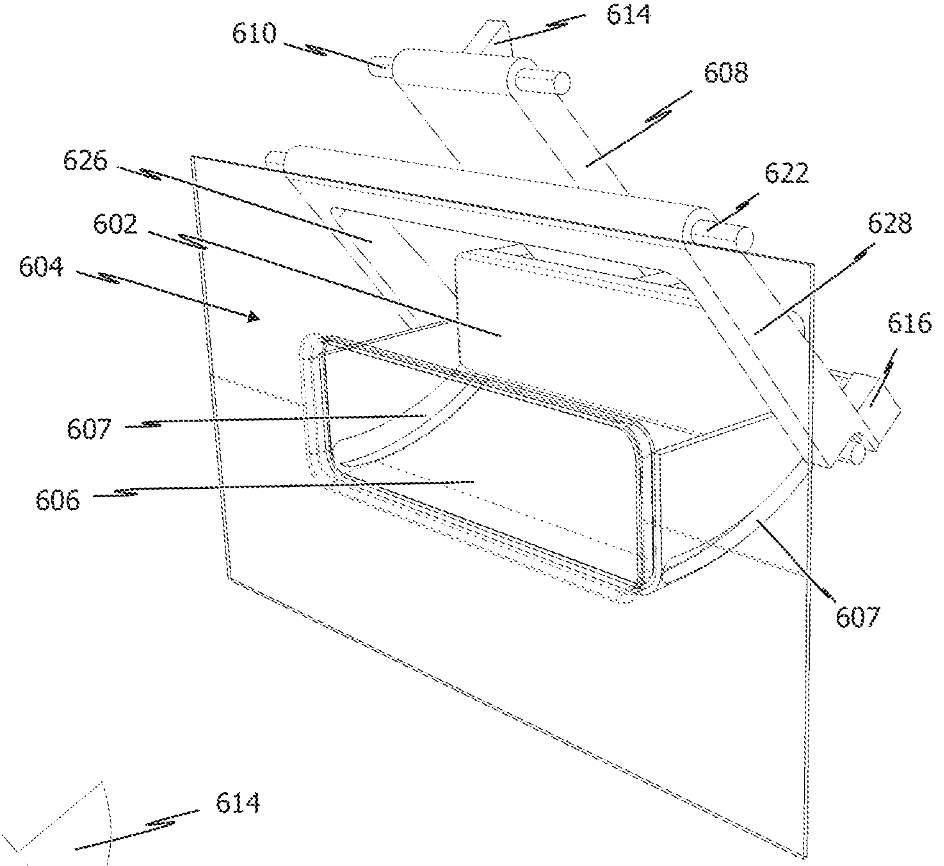
FIG. 6C illustrates a schematic perspective view of the embodiment according to FIG. 6A in its open position.
Figure 6D:
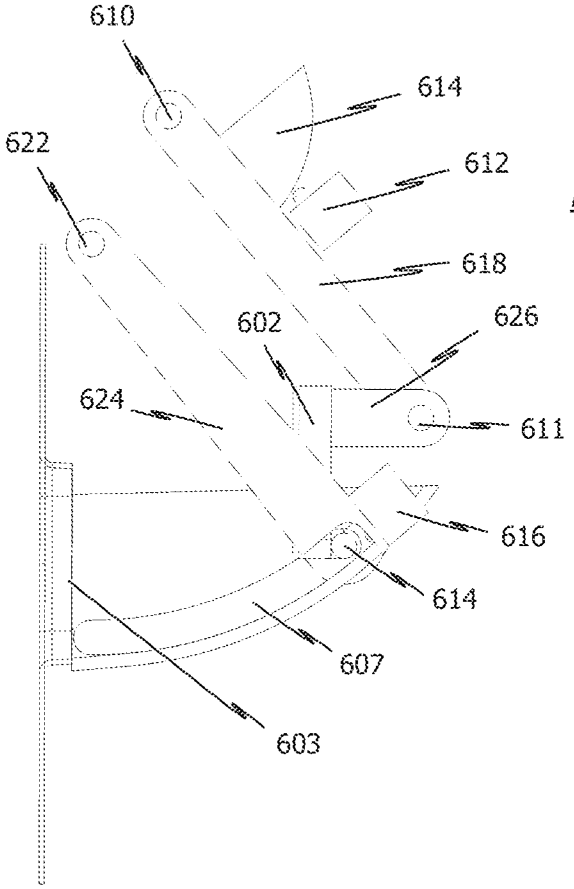
FIG. 6D illustrates a schematic cross-section through the view shown in FIG. 6C.

The pivot arm 518 comprises a stop face 520 that comes to lie flush with a flat stop face 507 of the door handle recess when the cover 502 is in the open position. In other words, the pivot arm 518 is configured such that the stop face 520 of the first pivot arm 518 lies in a plane with the stop face 507 of the door handle recess 506 when the cover is in its open position (FIG. 5D). The spring biasing pushes the rear side of the cover 502 against the stop face 507 of the door handle recess 506.

The door handle assembly 500 comprises a first sensor apparatus 512. The first sensor apparatus 512 is configured so as to detect the open position of the cover 502. For this purpose, the first sensor apparatus 512 is configured as a Hall sensor, which is arranged outside the door handle recess 506.

FIGS. 6A to 6D show a further aspect of an actuating apparatus configured as a door handle assembly 600. The door handle assembly 600 serves to move a cover 602 arranged flush with an outer skin 604 of a vehicle in its closed position. A kinematics 608 serves to move, in particular pivot, the cover 602 between the closed position shown in FIG. 6A and the open position shown in FIG. 6C.

The kinematics 608 comprises a first pivot arm 618, which is pivotable in relation to a first pivot axis 610. The kinematics 608 comprises a second pivot arm 624, which is pivotable in relation to a second pivot axis 622. The first pivot arm 618 is rotatably connected to the cover 602 via a first rotary joint 611. The second pivot arm 622 is rotatably connected to the cover 602 via a second rotary joint 614. The two pivot arms 618, 624, together with the rotary joints 611, 614 and the pivot axes 610, 622, form a four-bar linkage for pivoting the cover 602.

The first pivot arm 618 is connected to a first end (here, the top) of the cover 602. The second pivot arm 624 is rotatably connected to a second end (here, the bottom) of the cover 602. With the four-bar linkage formed by the first and second pivot arms 618, 624, the cover 602 is pivoted such that, in its closed position as well as its open position (cf. FIGS. 6B and 6D), it maintains the same orientation (here, the vertical orientation).

The door handle recess 606 of the door handle assembly 600 is substantially trough-shaped. The bottom of the door handle recess is in particular circularly arcuate in form, wherein the radius substantially corresponds to the length of the second pivot arm 624.

The second pivot arm 624 is fork-shaped. The second pivot arm is arranged outside the door handle recess 606. For this purpose, it comprises first and second webs 626, 628, which are connected at a first end to one another and to the second pivot axis 622. At a second end, the two webs 626, 628 are respectively connected to the cover, in particular to the second end (bottom) of the cover 602. In the example according to FIGS. 6A to 6D, the two webs 626, 628 comprise for this purpose pins 614 that extend through the wall of the door handle recess 606 and are rotatably connected to the cover 602.

The door handle recess 606 comprises a guide groove 607, which is configured as an elongated hole. The guide groove 607 serves to allow a passage of the pins 614 between the cover 602 located on the inside of the recess and the webs 626, 628 located on the outside. At the same time, the guide groove 607 ensures a uniform, repeatable movement of the cover in relation to the door handle recess 606.

The door handle assembly 600 comprises a first sensor apparatus 612 configured so as to detect the open position of the cover 602. For this purpose, the first pivot arm 618 is connected to or integrally formed with a cam disk 614. The cam disk 614 serves to actuate the first sensor apparatus 412 configured as a button when the kinematics 608 is in the closed position shown in FIG. 6D.

The door handle assembly 600 comprises a second sensor apparatus 616. The second sensor apparatus 616 serves to detect a local pressing actuation of the cover 602 in the closed position. For example, the user can press the cover 602 in the region 630 (FIG. 6A) in order to generate a relative movement of the cover in relation to the second sensor apparatus 616. The second sensor apparatus 616 configured herein as a Hall sensor can detect such a relative movement and emit a corresponding signal to an electric drive. According to this example, a sub-region of the cover 602 can be used as a button for activating an electric drive in order to open the cover 602.

A further aspect of a door arrangement 700 according to the disclosure can be seen in FIGS. 7A to 7D. The door handle assembly 700 is suitable for moving covers 702 between a closed position, in which it is arranged flush with an outer skin 704 of a vehicle, and an open position, in which the cover 702 is moved inwardly. The door handle assembly 700 comprises a kinematics 708 for moving the cover 702. By contrast to the examples discussed above, the kinematics 708 of FIGS. 7A to 7D are configured so as to move the cover 702 substantially translationally, not to pivot them.

The kinematics 708 comprises a first pivot arm 718*a*, which is configured as a cam disk 714. A second pivot arm 718*b* is also configured as a cam disk 714. The two pivot arms 718*a*, 718*b* are connected to one another and are pivotable in relation to a common first pivot axis 710. One end of the pivot arms 718*a*, 718*b* opposite the first pivot axis is connected to the cover 702 via a rotary joint 711. In particular, the pivot 711 is connected to a first (upper) end of the cover 702. At a second (lower) end of the cover 702, which lies opposite the first end, the cover comprises guide elements 722, for example laterally projecting pins. In other words, the guide elements 722 extend laterally beyond the cover.

The door handle assembly 700 comprises a door handle recess 706. The door handle recess 706 comprises guide grooves 707 that are arranged on both sides of the cover 702. The guide grooves have a substantially straight-line profile and serve to guide the cover 702 during the movement between the closed position (FIG. 7A) and the open position (FIG. 7C). In particular, the guide grooves 707 are configured so as to receive the guide elements 722 configured as pins. In the example shown in FIGS. 7A to 7D, the guide grooves 707 are arranged in particular obliquely to the outer skin 704.

One or both guide grooves 707 are substantially L-shaped. The long leg of the L-shape serves to guide the cover along a straight track during the opening or closing movement. The small leg of the L-shape serves to allow a pressing of the cover into the interior of the door handle recess 706 during the closed position.

The door handle assembly 700 comprises a first sensor apparatus 712 configured so as to detect the open position of the cover 702. For this purpose, the first sensor apparatus is arranged opposite one of the two pivot arms 718*a*, 718*b* configured as cam disks 714 (here, opposite 718*b*), such that the corresponding cam disk 714 activates the presser of the first sensor apparatus 712 when the cover 702 is in the closed position.

The door handle assembly further comprises a second sensor apparatus 716, which can detect a manual pressing of the cover 702. The second sensor apparatus 716 is also shown as a button. It is arranged outside the door handle recess 706, wherein the presser reaches into the short leg of the L-shaped guide groove 707. As soon as the user presses against the second lower end of the cover 702, for example in the region 730, the guide element 722 is displaced towards the small leg of the L-shape. Such a displacement activates the second sensor apparatus 716, which can be used in order to emit a signal to an electric drive for pivoting the pivot arms 718*a*, 718*b*.

The use of the door handle assembly 700 according to FIGS. 7A to 7D could occur as follows: a user approaches the vehicle and presses against the cover 702, in particular against the second (lower) end, for example in the region 730. This results in a displacement of the guide element 722 and thus an activation of the second sensor apparatus 716. The cover 702 can be biased such that it is returned to the starting position upon pressing by the user.

Due to the activation of the second sensor apparatus 716, a signal is emitted to an electric drive, which transfers a torque to the first pivot axis 710. Consequently, the two pivot arms 718*a*, 718*b* are pivoted with the pivot axis 710 until they assume the position shown in FIGS. 7C and 7D. When pivoting the two pivot arms 718*a*, 718*b*, the cover 702 is pulled upward along the longitudinal direction of the guide groove 707. In the example shown in the figures, the cover 702 is pulled up until the guide elements 722 are pulled out of the door handle recess 706. However, it is also possible that the guide elements 722 can remain in the long leg of the guide groove 707 in the open position. Such a translational upward pulling of the cover 702 ensures that the entire construction space of the door handle recess 706 is available for engagement by the user. Moreover, the translational movement requires less space than would be necessary, for example, to pivot the cover 702.

Figure 7A:
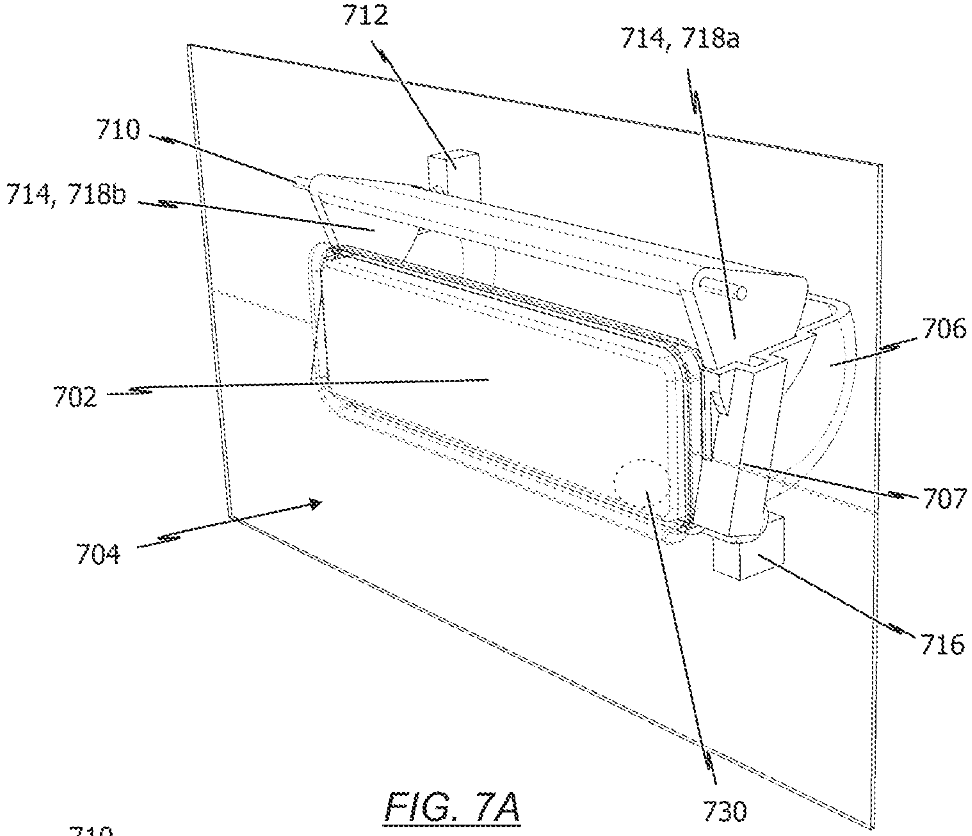
FIG. 7A illustrates a schematic perspective view of an apparatus according to an embodiment of the present disclosure, in the closed position.
Figure 7B:
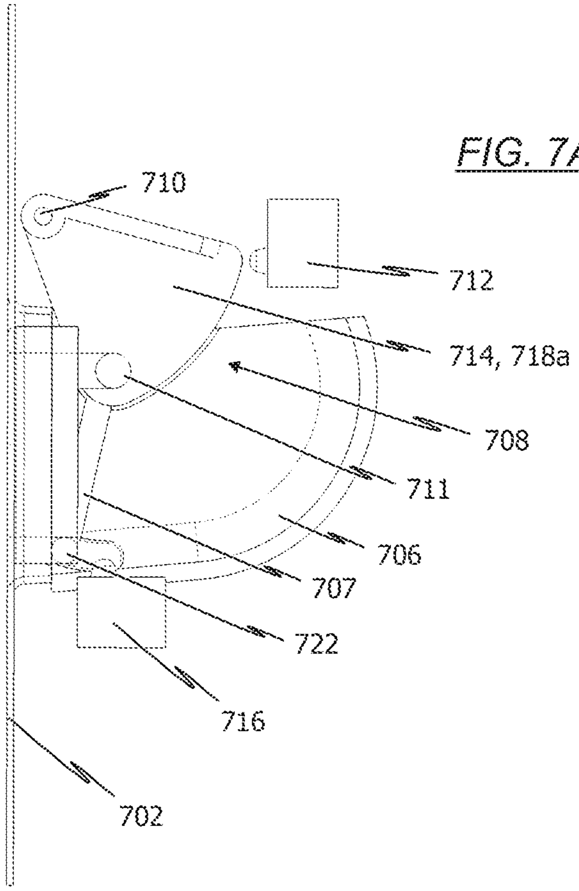
FIG. 7B illustrates a cross-section through the embodiment shown in FIG. 7A.
Figure 7C:
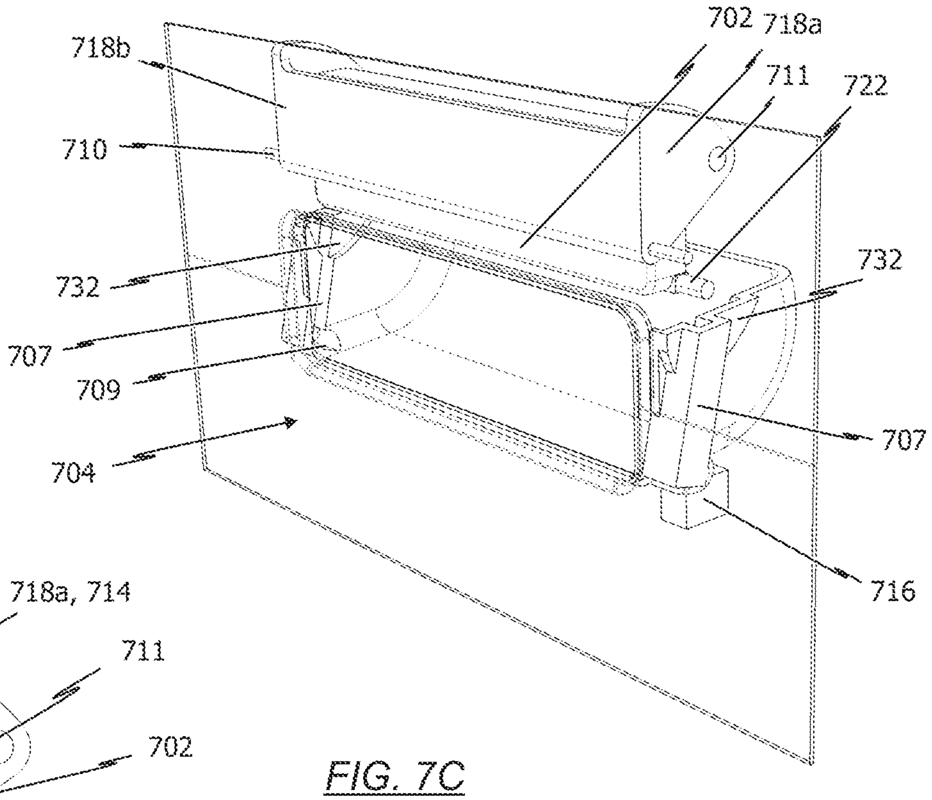
FIG. 7C illustrates a schematic perspective view of the embodiment according to FIG. 7A in its open position.
Figure 7D:
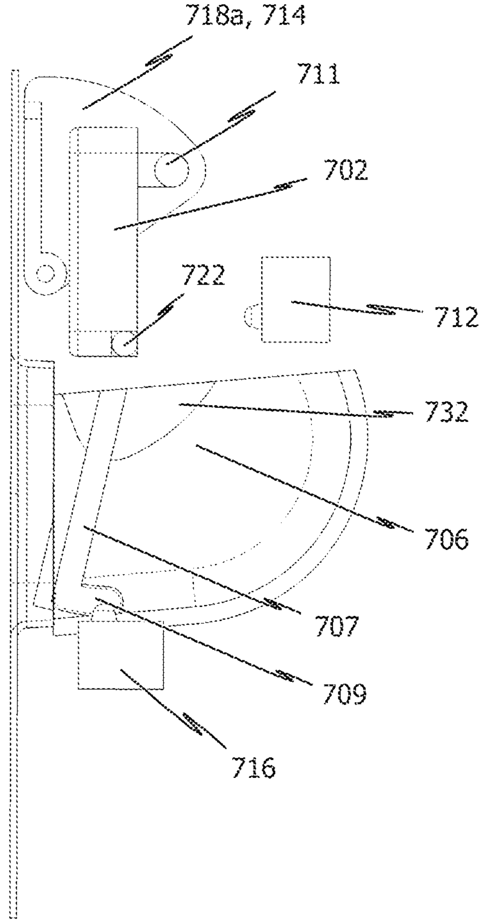
FIG. 7D illustrates a schematic cross-section through the view shown in FIG. 7C.

The door handle recess 706 further comprises indentations 732 for receiving the pivot arms 718*a*, 718*b* configured as cam disks 714 when they are in the closed position according to FIGS. 7A and 7B.

A further aspect of a door handle assembly 800 according to the disclosure can be seen in FIGS. 8A to 8D. The door handle assembly 800 is suitable for moving a cover 802 between a closed position (FIGS. 8A and 8B), in which it is arranged flush with an outer skin 804 of a vehicle, and an open position (FIGS. 8C and 8D), in which the cover 802 is moved inwardly. The door handle assembly 800 comprises a kinematics 808 for moving the cover 802. In particular, the cover 802 can be pivoted inwardly by the kinematics 808, that is to say towards a door handle recess 806 located behind the outer skin 804.

The kinematics 808 comprises a first pivot arm 818*a* connected to a first side of the flap 802. A second pivot arm 818*b* of the kinematics 808 is connected to a second end opposite the first end. The two pivot arms 818*a*, 818*b* are pivotable via a common first pivot axis 810.

Figure 8A:
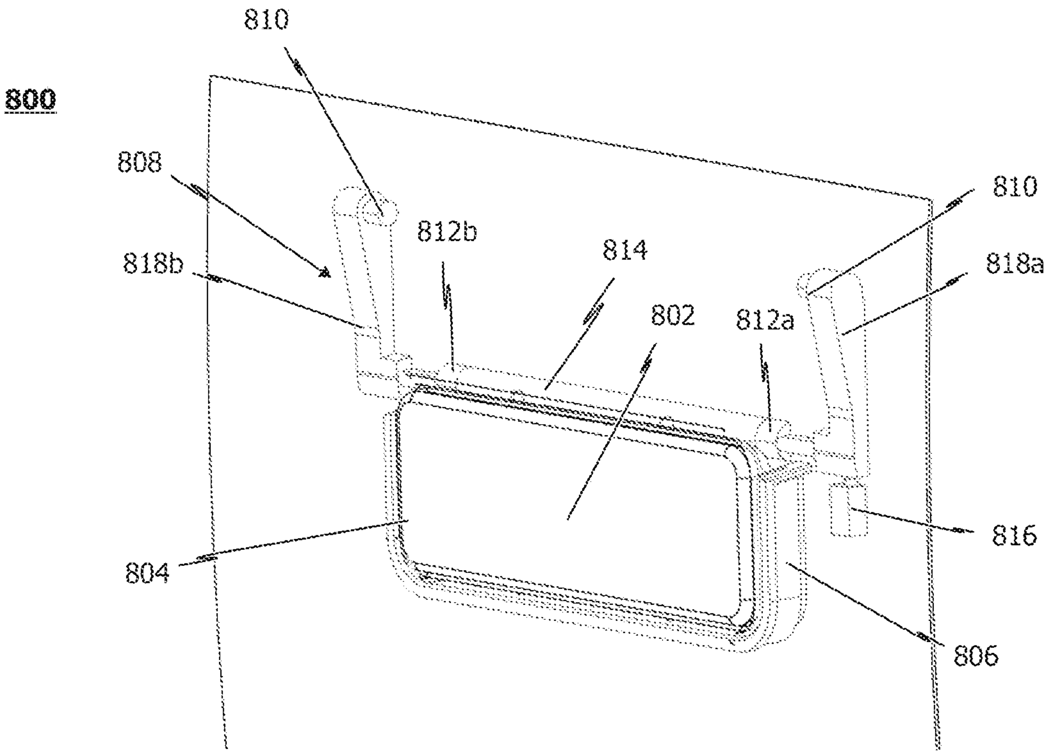
FIG. 8A illustrates a schematic perspective view of an apparatus according to an embodiment of the present disclosure, in the closed position.
Figure 8B:
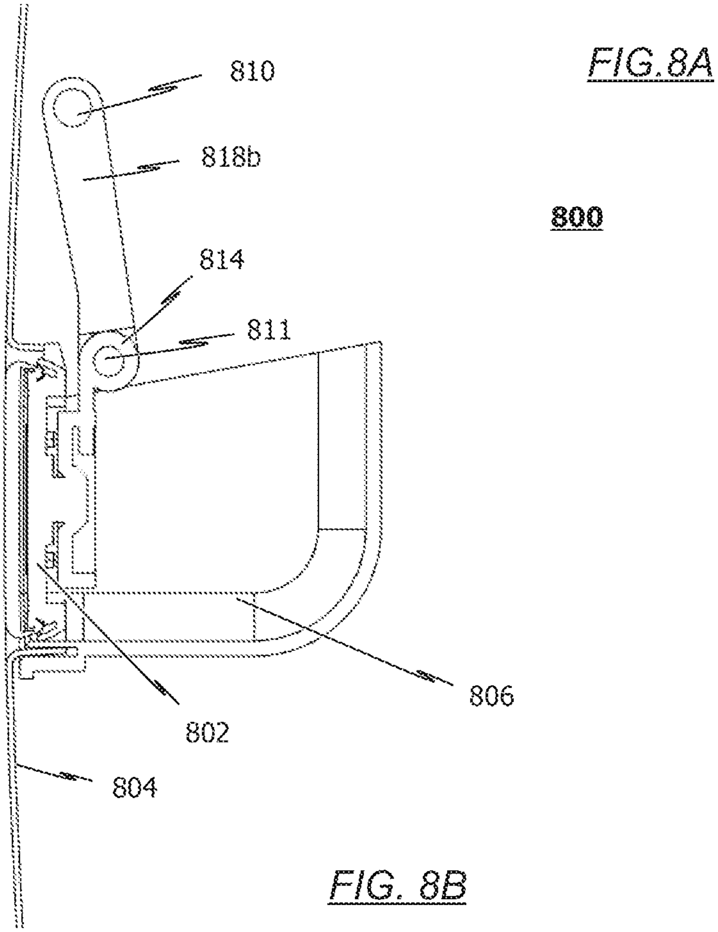
FIG. 8B illustrates a cross-section through the embodiment shown in FIG. 8A.

The ends of the pivot arms 818*a*, 818*b* opposite the first pivot axis 810 are connected to the cover 802 via a second pivot axis 811 (FIG. 8B). In particular, the second pivot axis 811 is connected to a first (upper) end of the cover 802. The two pivot arms 818*a*, 818*b* are connected to one another via the second pivot axis 811. In particular, the second pivot axis 811 is connected at a first end to a first bearing 812*a*, which is part of the first pivot arm 818*a*. At an opposite second end of the second pivot axis 811, it is connected to a second bearing 812*b*, which is part of the second pivot arm 818*b*.

The cover 802 comprises a sleeve 814, which is mounted at the top end of the cover 802. The sleeve 814 is pivotable with or in relation to the second pivot axis 811. The sleeve 814 surrounds the second pivot axis 811. The sleeve 814 can be fixedly connected to the second pivot axis 811. Alternatively, the sleeve 814 can be pivoted together with the second pivot axis 811.

The cover 802 can be biased into a home position in relation to the pivot arms 818*a*, 818*b* via the sleeve 814 and the second pivot axis 811, respectively. For example, this can be realized by a torsion spring (not shown) arranged between the second pivot axis 811 and one or both bearings 812*a*, 812*b*.

The door handle assembly 800 further comprises a sensor apparatus 816 configured so as to detect the closed position of the cover 802. A manual pressing in of the cover 802 can thus be detected by the sensor apparatus 816. In other words, a pressing of the cover 802 by the user from the closed position according to FIG. 8A causes the pivot arms 818*a*, 818*b* to pivot inwardly. Such a pivoting of the pivot arms 818*a*, 818*b* is detected by the sensor apparatus 816 configured as a button. Accordingly, the sensor apparatus 816 can generate a signal which can be used in order to activate an electric drive (not shown) for pivoting the pivot arms 818*a*, 818*b*.

In the closed position of the cover 802 shown in FIGS. 8A and 8B, the sensor apparatus 816 is in contact with the first pivot arm 818*a*. In particular, in the closed position of the cover 802 (here, having been pressed in), the sensor apparatus 816 configured as a button is activated by the second end of the first pivot arm 818*a* opposite the first pivot axis 810.

Figure 8C:
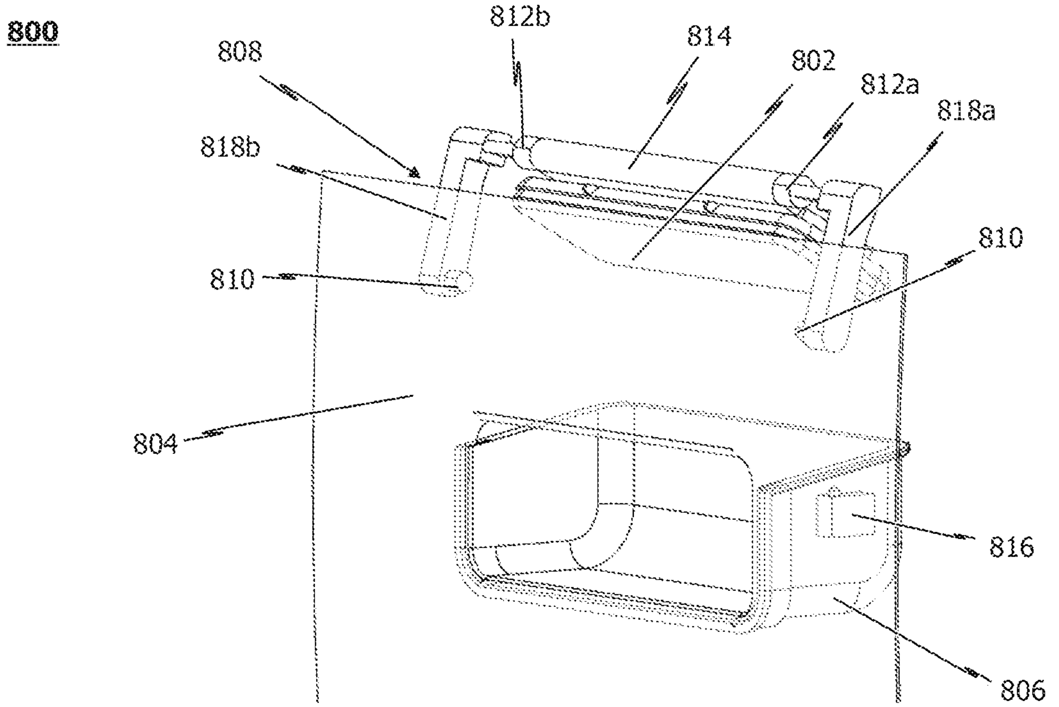
FIG. 8C illustrates a schematic perspective view of the embodiment according to FIG. 8A in its open position.
Figure 8D:
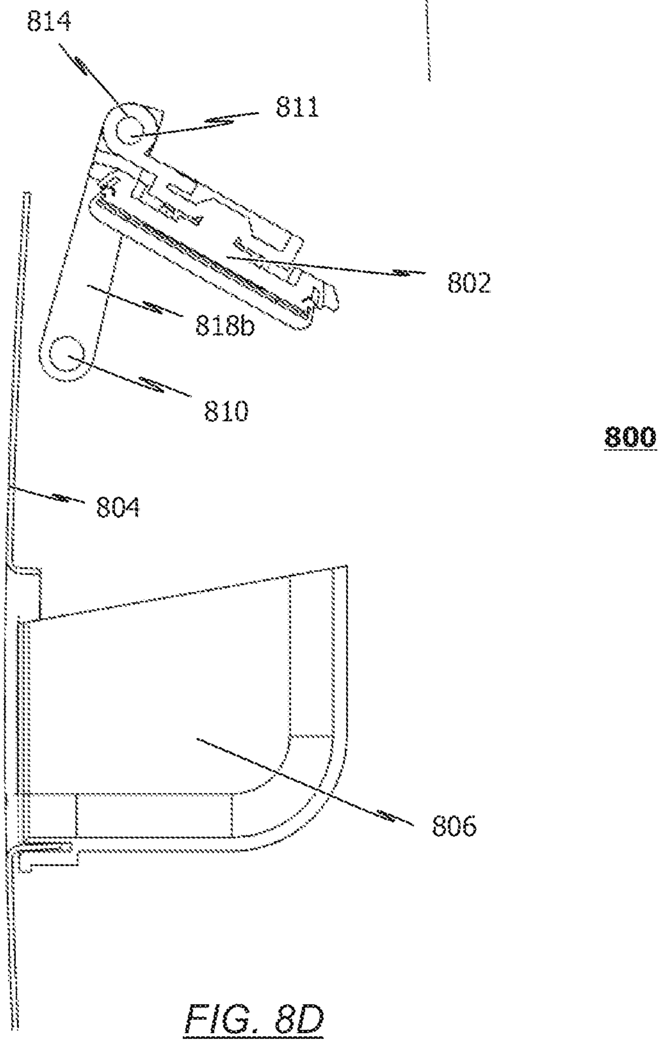
FIG. 8D illustrates a schematic cross-section through the view shown in FIG. 8C.

The door handle assembly 800 according to FIGS. 8A to 8D can also comprise a further sensor apparatus (not shown) configured so as to detect the open position of the cover according to FIGS. 8C and 8D.

FIGS. 8C and 8D show the door handle assembly 800 in the open position of the cover 802. In the open position, the two pivot arms 818*a*, 818*b* are pivoted inwardly (upwardly) by approximately 180° in relation to the closed position. Accordingly, the cover 802 is also pivoted behind the outer skin 804. In the open position, the cover is pivoted upwardly in relation to the door handle recess 806, as shown. As a result, the entire door handle recess 806 is released so that a user can readily engage into the door handle recess 806 for pulling open the door.

As can be seen in particular in FIG. 8D, when compared to the closed position, the cover 802 is pivoted in its open position in relation to the pivot arms 818*a*, 818*b*. The arrangement of the cover 802 shown in FIGS. 8C and 8D in relation to the pivot arms 818*a*, 818*b* is in particular a home position of the cover 802, in which it is biased, for example by the aforementioned torsion springs. In other words, provided no forces act on the cover 802 other than gravity, it will be transitioned into the relative position shown in FIG. 8D in relation to the pivot arms 818*a*, 818*b* due to the biasing of the torsion springs.

In the closed position shown in FIGS. 8A and 8B, the cover 802 is brought into a substantially parallel position with the pivot axes 818*a*, 818*b*, counter to the biasing of the torsion springs. This has the advantage that the cover 802 attempts to project beyond the outer skin 804 in the closed position due to the biasing. However, the cover 802 is connected to the outer skin in its closed position via various stops, such that the cover 802 terminates flush with the outer skin 804. Thus, the biasing has the advantage that the cover 802 is biased into its flush arrangement with the outer skin 804 in the closed position.

The disclosure is not limited to the examples shown in the drawings, but results when all of the features disclosed herein are considered together. Thus, the actuating apparatus according to the disclosure for moving covers is shown in the figures as a door handle assembly in each case. However, it is also possible to use the actuating apparatus in order to move servicing, fueling, or charging flaps.

What is claimed is:

1. An actuating apparatus to move a cover for covering a door handle recess of a vehicle, the cover moveable between a closed position in which the cover is flush with an outer skin of the vehicle, and an open position in which the cover is arranged within the handle recess behind the outer skin of the vehicle, the handle recess being configured for providing a suitable door handle engagement for a user's hand for operating the door when the cover is in the open position, the actuating apparatus comprising:

- a mechanism configured to pivot the cover between the open position in which the cover is positioned in the door handle recess, and the closed position;
- an electric motor configured to drive a pivoting motion of the cover via the mechanism; and
- a first sensor apparatus configured to detect the mechanism to detect whether the cover is in the open position or the closed position, wherein, when the cover has been pivoted to the open position, the sensor provides an electrical signal to an electric drive of an unlocking system for unlocking the door of the vehicle.

2. The actuating apparatus according to claim 1, wherein the mechanism comprises at least one cam disk for activating the first sensor apparatus upon a transition of the cover from the open position into the closed position.

3. The actuating apparatus according to claim 2, wherein the mechanism comprises a first pivot arm connected to the cover and pivotable in relation to a first pivot axis, wherein the at least one cam disk for activating the first sensor apparatus is connected to the first pivot axis.

4. The actuating apparatus according to claim 1, wherein the actuating apparatus comprises a second sensor apparatus configured to detect a pressing movement against the cover when the cover is in its closed position.

5. The actuating apparatus according to claim 1, wherein the actuating apparatus comprises the door handle recess which is mounted on a body interior and configured to guide movement of the mechanism during a movement between the closed position and the open position of the cover.

6. The actuating apparatus according to claim 5, wherein the door handle recess comprises a trough-shaped body and the mechanism extend through an opening of the trough-shaped body, and wherein the mechanism is sealed against the opening.

7. The actuating apparatus according to claim 5, wherein the mechanism comprises at least one cam disk for activating the first sensor apparatus upon a transition of the cover from the open position into the closed position, and wherein the cam disk is arranged outside the door handle recess.

8. The actuating apparatus according to claim 5, wherein the cover comprises a first end and a second end opposite to the first end, wherein the first end is rotatably connected to a first pivot arm, and wherein the second end comprises a guide element for guiding the cover in the door handle recess.

9. The actuating apparatus according to claim 8, wherein the door handle recess comprises a guide groove configured to receive the guide element of the cover and to guide the cover upon a movement of the cover by the mechanism.

10. The actuating apparatus according to claim 1, wherein the mechanism comprises a first pivot arm connected to the cover and pivotable in relation to a first pivot axis, and wherein the cover is connected to the first pivot arm via a rotary joint.

11. The actuating apparatus according to claim 10, wherein the mechanism comprises a spring element for biasing the cover into a neutral position in relation to the first pivot arm.

12. The actuating apparatus according to claim 1, wherein the mechanism comprises a first pivot arm connected to the cover via a first rotary joint and pivotable in relation to a first pivot axis, and wherein the mechanism comprises a second pivot arm connected to the cover via a second rotary joint and pivotable in relation to a second pivot axis, wherein the first and second pivot arms form a four-bar linkage for the cover.

13. The actuating apparatus according to claim 12, wherein the actuating apparatus comprises a door handle recess mounted on a body interior, and wherein the second pivot arm is fork-shaped and arranged outside the door handle recess.

14. The actuating apparatus according to claim 13, wherein the cover is arranged in the door handle recess and the second pivot arm is connected to the cover via one or more guide elements, and wherein the door handle recess comprises guide grooves for guiding the guide elements.

15. A vehicle having the actuating apparatus according to claim 1.

16. A door handle assembly for use in a vehicle having an opening, the door handle assembly comprising:

a cover configured to move relative to the opening between an open position in which the cover is in a door handle recess, and a closed position in which the cover is flush with an outer skin of the vehicle, wherein the door handle recess is configured for providing a suitable door handle engagement for a user's hand for operating the door when the cover is in the open position;

a mechanism configured to pivot the cover between the open position and the closed position;

an electric motor configured to drive a pivoting motion of the cover via the mechanism; and a sensor configured to detect the mechanism to detect whether the cover is in the open position or the closed position, wherein, when the cover has been pivoted to the open position, the sensor provides an electrical signal to an electric drive of an unlocking system for unlocking the door of the vehicle.

17. The door handle assembly according to claim 16, wherein the mechanism comprises:

a first pivot arm connected to the cover via a first rotary joint and pivotable in relation to a first pivot axis; and a second pivot arm connected to the cover via a second rotary joint and pivotable in relation to a second pivot axis, wherein the first pivot arm and second pivot arm form a four-bar linkage for the cover.

18. The door handle assembly according to claim 16, wherein the mechanism comprises:

at least one cam disk for activating the sensor upon a transition of the cover from the open position into the closed position; and a pivot arm connected to the cover and pivotable in relation to a pivot axis, wherein the at least one cam disk for activating the sensor is connected to the pivot axis.

19. An actuating apparatus configured to move a cover of a door handle recess in a vehicle relative to an opening in the vehicle to the door handle recess between an open position in which the cover is in the door handle recess, and a closed position in which the cover is flush with an outer skin of the vehicle, wherein the door handle recess is configured for providing a suitable door handle engagement for a user's hand for operating the door when the cover is in the open position, the actuating apparatus comprising:

a mechanism configured to pivot the cover between the open position and the closed position;

an electric motor configured to drive a pivoting motion of the cover via the mechanism; and a sensor configured to detect the mechanism to detect whether the cover is in the open position or the closed position, wherein, when the cover has been pivoted to the open position, the sensor provides an electrical signal to an electric drive of an unlocking system for unlocking the door of the vehicle.

20. The actuating apparatus according to claim 19, wherein the mechanism comprises:

a first pivot arm connected to the cover via a first rotary joint and pivotable in relation to a first pivot axis; and a second pivot arm connected to the cover via a second rotary joint and pivotable in relation to a second pivot axis, wherein the first pivot arm and second pivot arm form a four-bar linkage for the cover.

* * * * *